(12) United States Patent
Spaulding et al.

(10) Patent No.: US 12,408,240 B2
(45) Date of Patent: Sep. 2, 2025

(54) INDUCTIVE HEATING FOR COLD WEATHER CHARGING

(71) Applicant: MILWAUKEE ELECTRIC TOOL CORPORATION, Brookfield, WI (US)

(72) Inventors: Andrew J. Spaulding, Racine, WI (US); Kyle C. Fassbender, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 875 days.

(21) Appl. No.: 17/538,459

(22) Filed: Nov. 30, 2021

(65) Prior Publication Data

US 2022/0174794 A1 Jun. 2, 2022

Related U.S. Application Data

(60) Provisional application No. 63/119,918, filed on Dec. 1, 2020.

(51) Int. Cl.
| | | |
|---|---|---|
| *H05B 6/14* | (2006.01) | |
| *H01M 10/615* | (2014.01) | |
| *H01M 10/6235* | (2014.01) | |
| *H05B 6/10* | (2006.01) | |
| *H01F 38/14* | (2006.01) | |
| *H01M 10/48* | (2006.01) | |
| *H01M 10/6571* | (2014.01) | |
| *H02J 50/12* | (2016.01) | |

(52) U.S. Cl.
CPC ............ *H05B 6/14* (2013.01); *H01M 10/615* (2015.04); *H01M 10/6235* (2015.04); *H05B 6/105* (2013.01); *H01F 38/14* (2013.01); *H01M 10/486* (2013.01); *H01M 10/6571* (2015.04); *H02J 50/12* (2016.02)

(58) Field of Classification Search
CPC ........... H01M 10/615; H01M 10/6235; H01M 10/486; H01M 10/6571; H05B 6/105; H05B 6/14; H02J 50/12; H01F 38/14
USPC .......................................................... 320/150
See application file for complete search history.

(56) References Cited

U.S. PATENT DOCUMENTS 3,654,426 A 4/1972 Brinkmann et al.
4,081,737 A 3/1978 Miyahara
(Continued)

FOREIGN PATENT DOCUMENTS

CN 202888352 U 4/2013
CN 204596904 U 8/2015
(Continued)

OTHER PUBLICATIONS

International Search Report and Written Opinion for Application No. PCT/US2021/061204 dated Mar. 21, 2022 (9 pages).

*Primary Examiner* — Julian D Huffman
*Assistant Examiner* — Aiman Bickiya
(74) *Attorney, Agent, or Firm* — Michael Best & Friedrich LLP

(57) ABSTRACT

An inductive heater assembly for heating a power tool battery pack, the inductive heater assembly comprising a housing, a battery pack interface configured to receive the power tool battery pack, a charging base, a coil portion located within the housing. The coil portion including a first coil winding and a second coil winding configured to generate an electromagnetic field, wherein the first coil winding and the second coil winding to form a Helmholtz coil.

20 Claims, 25 Drawing Sheets

(56) References Cited

U.S. PATENT DOCUMENTS

| | | |
|---|---|---|
| 6,002,240 A | 12/1999 | McMahan et al. |
| 7,446,508 B2 | 11/2008 | Aradachi et al. |
| 2002/0070710 A1 | 6/2002 | Yagi et al. |
| 2004/0070369 A1 | 4/2004 | Sakakibara |
| 2006/0220620 A1* | 10/2006 | Aradachi ............ H02J 7/04 320/150 |
| 2011/0052944 A1 | 3/2011 | Matthias et al. |
| 2013/0106361 A1* | 5/2013 | Wissmach ........ H01M 10/615 320/135 |
| 2014/0117922 A1 | 5/2014 | Pham |
| 2014/0159640 A1 | 6/2014 | Yoshikawa et al. |
| 2014/0327396 A1 | 11/2014 | Rejman et al. |
| 2016/0043447 A1 | 2/2016 | Peh et al. |
| 2017/0047627 A1 | 2/2017 | Englert |
| 2019/0252742 A1 | 8/2019 | Liu et al. |
| 2019/0386357 A1* | 12/2019 | McHugh ........... H01M 10/657 |
| 2020/0196398 A1* | 6/2020 | Ok .................... H05B 6/065 |
| 2020/0259338 A1 | 8/2020 | Taylor et al. |

FOREIGN PATENT DOCUMENTS

| | | | |
|---|---|---|---|
| CN | 103985831 B | 3/2016 | |
| CN | 206412445 U | 8/2017 | |
| DE | 102012206623 A1 | 10/2013 | |
| JP | H06217466 A | 8/1994 | |
| JP | H1155869 A | 2/1999 | |
| KR | 1020120032218 A | 4/2012 | |
| KR | 20180035269 A | 4/2018 | |
| KR | 1020190135077 A | 12/2019 | |
| WO | WO-2012095331 A1 * | 7/2012 | ......... H01M 10/615 |

\* cited by examiner

INDUCTIVE HEATING FOR COLD WEATHER CHARGING

RELATED APPLICATION

This application claims the benefit of U.S. Provisional Patent Application No. 63/119,918, filed on Dec. 1, 2020, the entire content of which is hereby incorporated by reference.

FIELD

Embodiments described herein relate to battery packs and, more particularly, to an apparatus and method of heating battery packs to be charged in cold weather.

SUMMARY

Many electrical devices (e.g., power tools, outdoor tools, other motorized or non-motorized devices) powered by battery packs including lithium-based battery cells must operate in environments below the optimum charging temperatures. These electrical devices may also sit all night in adverse/cold weather conditions. These electrical devices and the associated battery packs are generally required to become operable within a short time period.

In order to maintain capacity and performance, lithium-based battery cells typically should not be charged when below a certain temperature threshold. However, as mentioned above, charging of battery packs including such cells and operation of tools and devices powered by such battery packs often occurs in cold environments.

Embodiments described herein provide an inductive heater assembly for heating a power tool battery pack. The inductive heater assembly includes a charging base, a charging interface, a housing, and at least two Helmholtz coil windings. The charging base is configured to electrically connect the inductive heater assembly to a power source device. The charging interface is configured to mechanically and electrically connect to the power tool battery pack.

In some embodiments, a system is provided for heating a battery pack. The battery pack includes a pack interface for mechanical and electrical connection to an electrical device (e.g., a power tool) to be powered by the battery pack. The system includes a battery charger operable to charge the battery pack and having a charger interface mechanically and electrically connectable to the pack interface. The system also includes an inductive heater assembly operable to inductively heat the battery pack. The heater assembly includes an interface mechanically and electrically connectable to the pack interface, a circuit operable to receive power from the charger, and at least one coil winding operable to receive power from the circuit and generate a magnetic field to heat the battery pack before charging.

In some embodiments, the heater assembly is operable to heat the battery pack when a temperature of the battery pack is less than or equal to a charging temperature threshold. In some embodiments, the heater assembly is operable to charge the battery pack when the temperature of the battery pack exceeds the charging temperature threshold.

In some embodiments, an inductive heater assembly operable to heat a battery pack is provided. The battery pack includes a pack interface for mechanical and electrical connection to an electrical device to be powered by the battery pack. The heater assembly includes a housing with an interface mechanically and electrically connectable to the pack interface. A circuit is operable to receive power from a power source (e.g., a charger for the battery pack), and a coil winding is operable to receive power from the circuit and generate a magnetic field to heat the battery pack.

In some embodiments, a method of inductively heating a battery pack is provided. The method includes, before supplying power from a circuit to a coil winding, determining whether a temperature of the battery pack is less than or equal to a charging temperature threshold, and, when the temperature of the battery pack is less than or equal to a charging temperature threshold, supplying power from the circuit to the coil winding to cause the coil winding to generate a magnetic field to heat the battery pack. In some embodiments, the method further includes, when the temperature of the battery pack exceeds the charging temperature threshold, supplying power from the charger to the circuit to charge the battery pack.

In some embodiments, an inductive heater assembly includes at least one Helmholtz coil stage configured to receive a battery pack. In other embodiments, an inductive heater assembly includes at least three Helmholtz coil windings configured to receive two battery packs.

Inductive heater assemblies described here for heating a power tool battery pack include a housing, a battery pack interface configured to receive the power tool battery pack, and a coil portion located within the housing. The coil portion includes a first coil winding and a second coil winding configured to generate an electromagnetic field. The first coil winding and the second coil winding form a Helmholtz coil.

In some aspects, the housing is configured to receive a single battery pack.

In some aspects, the housing is configured to receive a plurality of battery packs.

In some aspects, the inductive heater assemblies further include a temperature sensor configured to sense a temperature related to the power tool battery pack.

In some aspects, the battery pack interface is positioned within the housing.

In some aspects, the inductive heater assemblies further include an active resonator control.

In some aspects, the active resonator control is configured to control an operating frequency through pulse-width-modulation.

In some aspects, the inductive heater assemblies further include a passive resonator control.

In some aspects, the passive resonator control is configured to control at least one capacitor.

In some aspects, the inductive heater assemblies further include a charging base positioned between the first coil winding and the second coil winding.

In some aspects, the charging base is configured to support the battery pack interface.

In some aspects, the inductive heater assemblies further include a third coil winding.

In some aspects, the housing includes a second charging base.

In some aspects, the second charging base is configured to support a second battery pack interface.

In some aspects, the second coil winding and the third coil winding are configured to generate a second electromagnetic field.

Inductive heating systems described herein include a power tool battery pack and an enclosure. The enclosure includes a housing, a charging base configured to support a charging interface, and at least one coil portion. The at least one coil portion includes a first coil winding and a second coil winding. The first coil winding and the second coil winding form a Helmholtz coil.

In some aspects, the housing is configured to receive a single battery pack.

In some aspects, the housing is configured to receive a plurality of battery packs.

In some aspects, the inductive heating system further includes a temperature sensor configured to sense a temperature related to the power tool battery pack.

In some aspects, the inductive heating system further includes an active resonator control.

In some aspects, the active resonator control is configured to control an operating frequency through pulse-width-modulation.

In some aspects, the inductive heating system further includes a passive resonator control.

In some aspects, the passive resonator control is configured to control at least one capacitor.

In some aspects, the charging base is positioned between the first coil winding and the second coil winding.

In some aspects, the inductive heating system further includes a third coil winding.

In some aspects, the housing includes a second charging base.

In some aspects, the second charging base is configured to support a second charging interface.

In some aspects, the second coil winding and the third coil winding are configured to generate a second electromagnetic field.

Methods of inductively heating a power tool battery pack described herein include connecting a power source to a housing including a battery pack interface. The battery pack interface is located between a first coil winding and a second coil winding. The method further includes connecting a power tool battery pack to the battery pack interface, and generating an electromagnetic field between the first coil winding and the second coil winding. The first coil winding and the second coil winding form a Helmholtz coil.

In some aspects, the methods further include connecting a second power tool battery pack to a second battery pack interface.

In some aspects, the methods further include sensing a temperature related to the power tool battery pack.

In some aspects, the housing includes an active resonator control within the housing.

In some aspects, the methods further include controlling an operating frequency through pulse-width-modulation.

In some aspects, the housing includes a passive resonator control within the housing.

In some aspects, the methods further include controlling at least one capacitor.

In some aspects, the battery pack interface is a charging base.

In some aspects, the methods further include charging the power tool battery pack.

In some aspects, the housing includes a second battery pack interface located between the second coil winding and a third coil winding.

In some aspects, the second battery pack interface is a second charging base.

In some aspects, the methods further include charging a second power tool battery pack through the second charging base.

In some aspects, the methods further include generating a second electromagnetic field between the second coil winding and the third coil winding.

Inductive heater assemblies described herein for heating a power tool battery pack include a housing, a battery pack interface configured to receive the power tool battery pack, a coil portion located in the housing and including a first coil winding and a second coil winding, and resonator control. The resonator control is configured to control the first coil winding and the second coil winding. The first coil winding and the second coil winding form a Helmholtz coil.

In some aspects, the inductive heater assembly further includes the housing is configured to receive a plurality of battery packs.

In some aspects, the inductive heater assembly further includes a temperature sensor configured to sense a temperature related to the power tool battery pack.

In some aspects, the resonator control is configured to control an operating frequency through pulse-width-modulation.

In some aspects, the resonator control is configured to control at least one capacitor.

In some aspects, the battery pack interface is positioned between the first coil winding and the second coil winding.

In some aspects, the battery pack interface is a charging interface.

In some aspects, the inductive heater assembly further includes a third coil winding.

In some aspects, the housing includes a second battery pack interface.

In some aspects, the second battery pack interface is configured to receive a second power tool battery pack.

In some aspects, the second battery pack interface is located between the second coil winding and the third coil winding, and the second coil winding and the third coil winding are configured to generate a second electromagnetic field.

Methods of inductively heating a power tool battery pack described herein include receiving the power tool battery pack in a battery pack interface. The battery pack interface is located in a coil portion between a first coil winding and a second coil winding. The method also includes controlling an operating frequency of the first coil winding and the second coil winding using a resonator control and generating an electromagnetic field between the first coil winding and the second coil winding. The first coil winding and the second coil winding form a Helmholtz coil.

In some aspects, the methods further include receiving a second power tool battery pack in a second battery interface.

In some aspects, the methods further include sensing a temperature related to the power tool battery pack.

In some aspects, the methods further include controlling the operating frequency through pulse-width-modulation.

In some aspects, the battery pack interface is a charging interface.

In some aspects, the coil portion is located within an enclosure including an upper housing portion and a lower housing portion.

In some aspects, the methods further include pivoting the upper housing portion relative to the lower housing portion.

In some aspects, the coil portion includes a third coil winding.

In some aspects, the methods further include receiving a second power tool battery pack in a second battery pack interface, and the second battery pack interface is located in the coil portion between the second coil winding and the third coil winding.

In some aspects, the second battery pack interface is a second charging interface.

In some aspects, the methods further include generating a second electromagnetic field between the second coil winding and the third coil winding.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

In the illustrated embodiments, an inductive heater assembly is operable to heat a battery pack using inductive heating. Specifically, the inductive heater assembly includes one or more Helmholtz coils.

Figure 1:
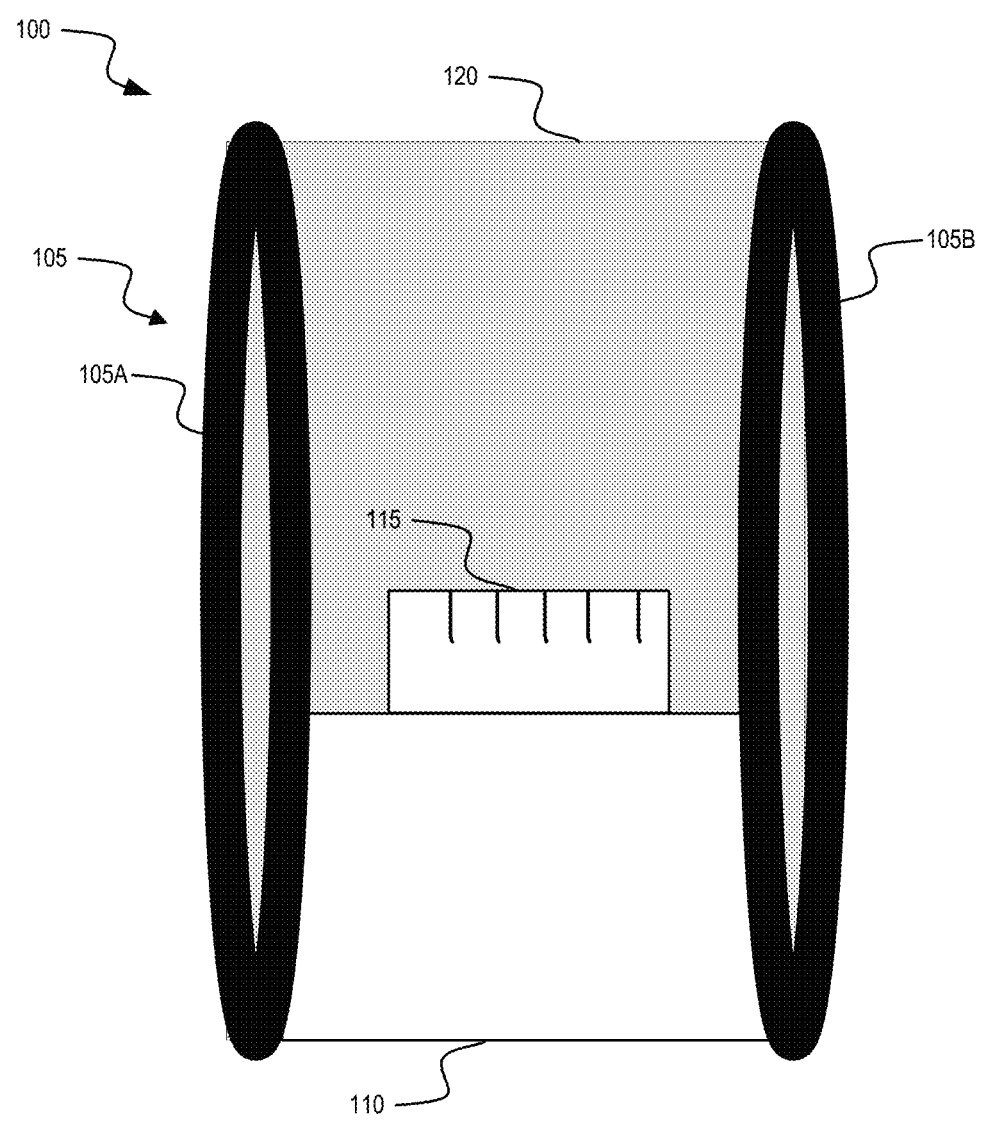
FIG. 1 is a front view of an inductive heater assembly for a single battery pack.

FIG. 1 illustrates an inductive heater assembly 100 for cold weather charging of battery packs. The inductive heater assembly 100 includes at least two Helmholtz coil windings 105A, 105B that form a Helmholtz coil 105, with one winding 105A, 105B located on each sides of the housing 120. A charging base 110 is positioned between the at least two Helmholtz coil windings 105A, 105B and supports a charging interface 115. In some embodiments, charging base is suspended at a different location within the housing 120.

Figure 2:
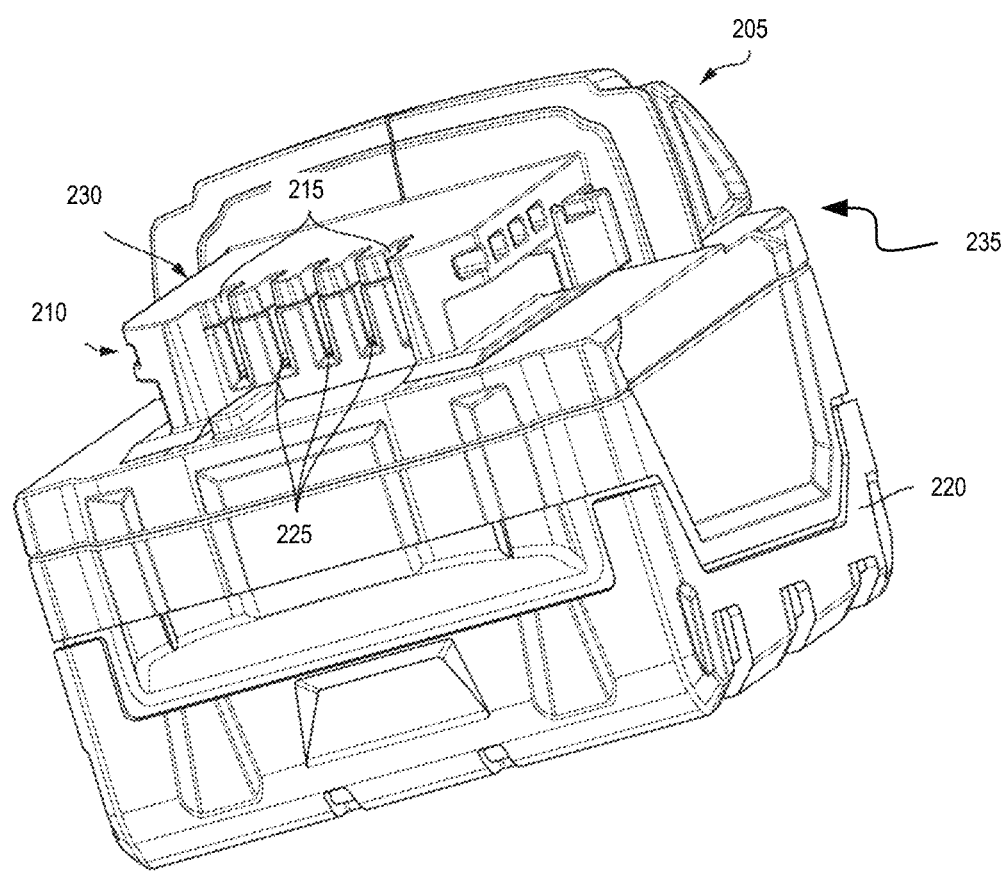
FIG. 2 is a top perspective view of a battery pack to be heated by the heater assembly of FIG. 1.

FIG. 2 illustrates a battery pack 235. A housing 220, as illustrated in FIG. 2, provides a support portion 210 for connection to the heater assembly 100. The illustrated support portion 210 provides a slide-on interface with rails and grooves extending along a terminal block 230. The terminal block 230 includes female power terminals 225 electrically connected to battery cells within the battery pack 235 to facilitate transfer of power from/to the battery cells. In the illustrated embodiment, the terminal block 230 includes one or more power terminals 215 and one or more communication terminals 225 to transmit information between the battery pack 235 (e.g., a battery pack controller) and the heater assembly 100.

In the illustrated embodiment, the battery pack 235 includes a battery pack controller operable to, for example, determine information regarding a status of the battery pack 235 (e.g., a state-of-charge, a temperature, etc.). The battery pack 235 includes an indicator (e.g., one or more light-emitting diodes [LEDs]) operable to communicate information (e.g., the state-of-charge, an operating condition, etc.) to a user.

When the battery pack 235 is below a predetermined threshold temperature (e.g., a threshold at or below which charging may cause damage to or impede/reduce performance of the battery pack 235). In some embodiments, the threshold temperature is about 5 degrees Celsius [° C.]). The heater assembly 100 receives power (e.g., from a separate power source such as AC mains power) to heat the battery pack 235 before charging. When the battery pack 235 is heated to a temperature above the predetermined temperature threshold, the inductive heater assembly 100 is configured to provide power through the charging interface 115 to charge the battery pack 235. In other embodiments, the heater assembly 100 only be operable to heat the battery pack 235. The illustrated heater assembly 100 of FIG. 1 may also heat the battery pack 235 during charging and/or after charging, as necessary to maintain the temperature of the battery pack 235 above the threshold temperature.

The illustrated battery pack 235 is operable to supply power to an electrical device, such as a power tool, an outdoor tool, or another motorized or non-motorized device. The battery pack 235 illustrated in FIG. 2 includes a housing 220 supporting a plurality of battery cells 300 (see FIG. 3) to provide power to the electrical device. The battery cells 300 are electrically connected to provide the desired output (e.g., nominal voltage, current capacity, etc.) of the battery pack 235. In other embodiments, the battery pack 235 may have a different configuration, such as a tower-style configuration in which the battery pack 235 is connected along the axis of the tower portion. A latch assembly 205 is provided to releasably connect the battery pack 235 at least to the electrical device.

Figure 3:
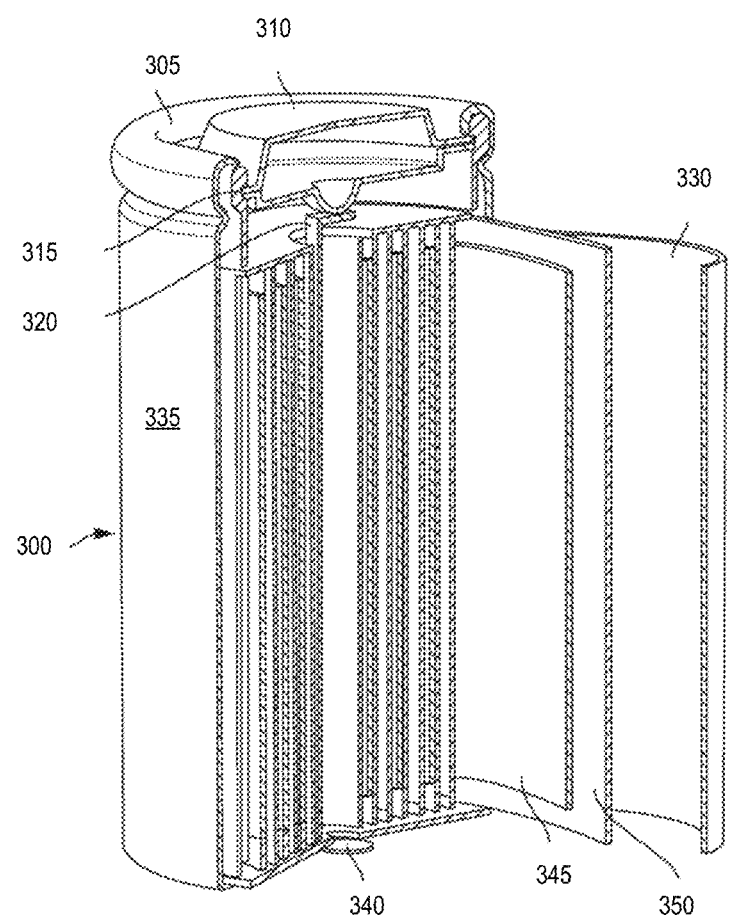
FIG. 3 is a diagram of components in an individual battery cell within the battery pack of FIG. 2

FIG. 3 illustrates a lithium ion battery cell. As shown in FIG. 3, each battery cell 300 includes an anode (negative plate) 330 and a cathode (positive plate) 345, an electrolyte allows for ionic movement between the anode 330 and cathode 345, a cover 305, an insulating ring 315, a positive tab 320, and a separator 350 that separates the cathode 345 and the anode 330. The battery cell 300 includes a positive terminal 310 and a negative terminal 340 provided by an outer case 335. In the illustrated embodiment, the outer case 335 is made of steel, which facilitates the induction of eddy currents from a generated electromagnetic field of the heater assembly 100. In other embodiments, other conductive material may be used in the case 335.

Each battery cell 300 may have a nominal voltage between about 3 Volts (V) and about 5 V. The battery pack 235 may have a nominal capacity between about 3 Amp-hours (Ah) (e.g., for a battery pack with one string of five series-connected battery cells 300 [a "5S1P" pack]) and about 5 Ah (e.g., for a "5S2P" pack) or more (e.g., about 9 Ah for a 5S3P pack). In the illustrated embodiment, the battery cells 300 are rechargeable and have a Lithium-based chemistry (e.g., Lithium [Li], Lithium-ion [Li-ion], other Lithium-based chemistry, etc.). In other embodiments, the battery cells 300 may have a different chemistry such as, for example, Nickel-Cadmium (NiCd), Nickel-Metal Hydride (NiMH), etc.

Figure 4:
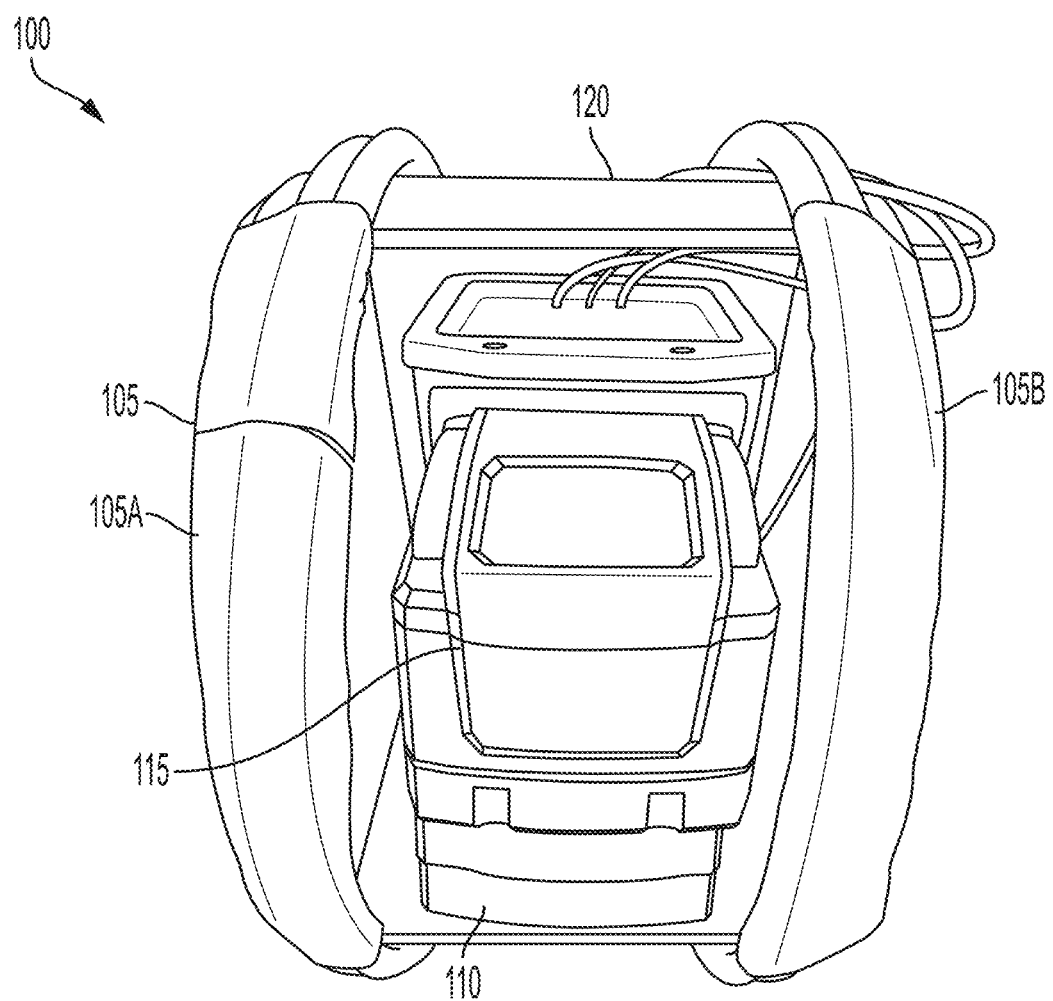
FIG. 4 is a front view of the implementation of the inductive heater assembly of FIG. 1.

FIG. 4 illustrates an embodiment of the heater assembly 100. The housing 120 wraps around the charging interface 115 and the charging base 110. The Helmholtz coil 105 and Helmholtz coil windings 105A, 105B are on either side of the housing 120 to allow the production of an electromagnetic field to flow through the housing 120 and through a battery pack mounted to the charging interface 115 of the charging base 110.

Figure 5:
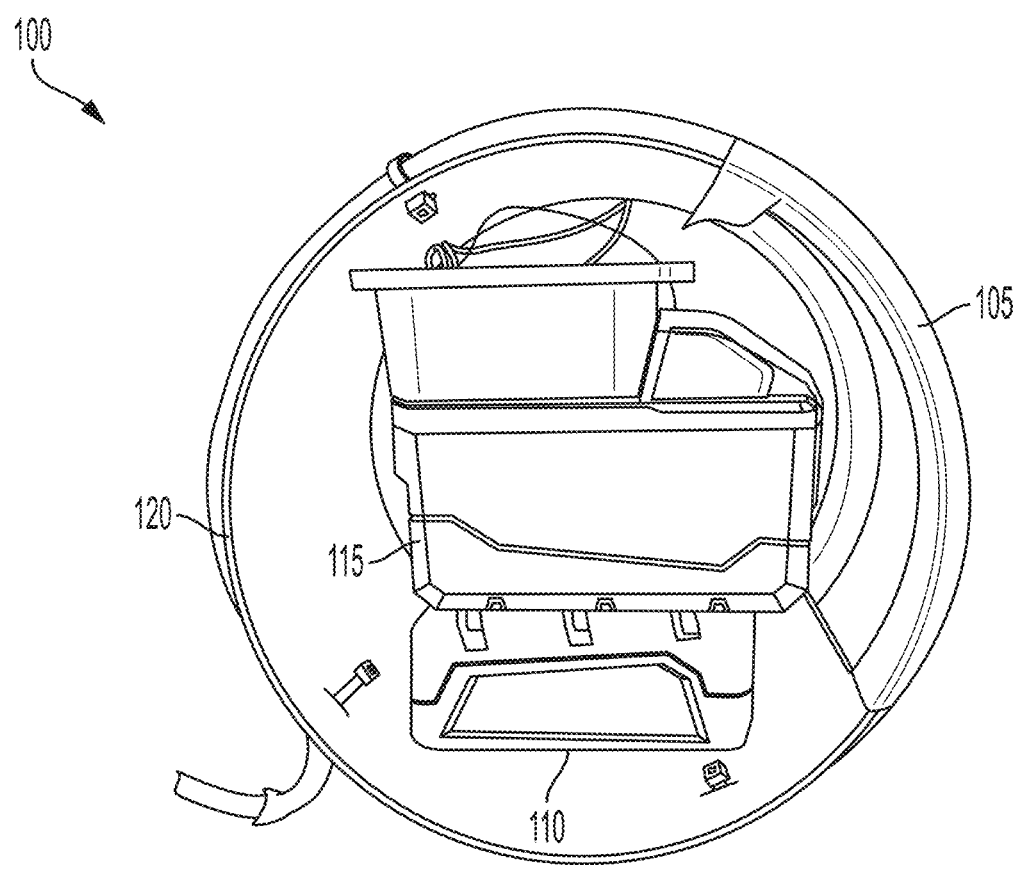
FIG. 5 is a side view of the implementation of the inductive heater assembly of FIG. 1.

FIG. 5 illustrates a side view of the heater assembly 100. The housing 120 encloses the charging interface 115 and charging base 110 in an approximately circular or cylindrical form factor. The Helmholtz coil windings 105A, 105B wrap around the outside of the housing 120 in order to produce an electromagnetic field that flows throughout the housing 120.

Figure 6:
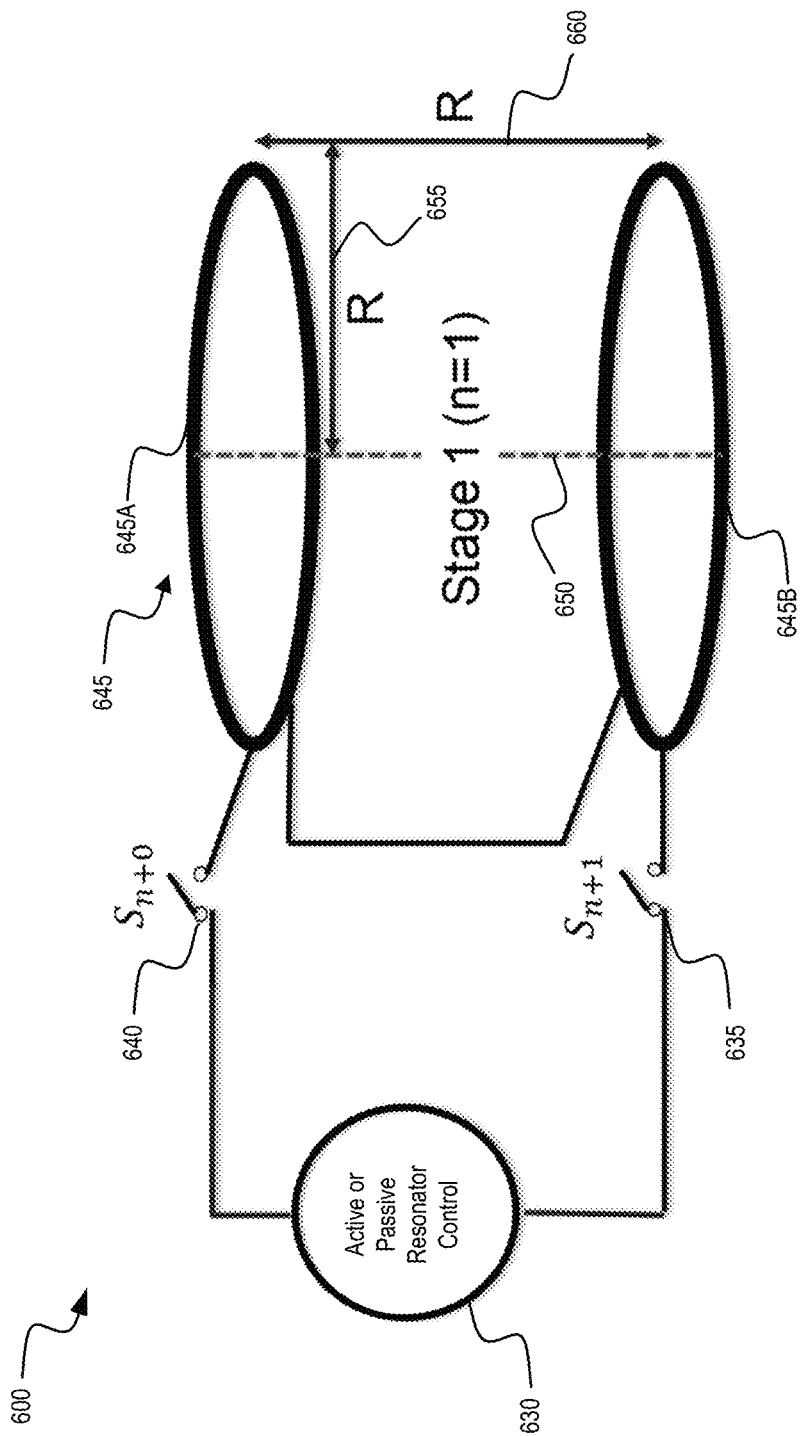
FIG. 6 is a schematic of the single-stage Helmholtz coil.

FIG. 6 illustrates a schematic diagram 600 of the heater assembly 100 including a single stage Helmholtz coil 645 and coil windings 645A, 645B. Multiple Stages of the Helmholtz coil 645 and coil windings 645A, 645B can be connected in series or parallel. The higher number of stages that the heater assembly 100 includes, the more battery packs 235 the heater assembly 100 can hold. The schematic diagram 600 illustrates an active or passive resonator control 630. An active resonator control 630 can actively control an operating frequency through the use of pulse-width-modulation ("PWM"). A passive resonator control 630 can passively switch from different capacitor banks in series or in parallel with the Helmholtz coil windings 645A, 645B. This allows the Helmholtz coil 645 to be operated at the Helmholtz coil winding 645A, 645B's natural, resonating frequency. In other embodiments, a Zero Voltage Switching (ZVS) method can be implemented. Using the ZVS method would minimize the switching losses within the resonator control 630. Current flow moves from the resonator control 630 to a first switch $S_{n+0}$ 640. A second switch $S_{n+1}$ 635, is also connected to the resonator control 630. When the first switch $S_{n+0}$ 640 and the second switch $S_{n+1}$ 635 are closed, the resonator control 630 provides a control to the Helmholtz coil windings 645A, 645B.

The inductance of the Helmholtz coil windings 645A, 645B of the heater assembly 100 is modeled using EQN 1:

$$L = \frac{\mu N^2 A}{l} \qquad \text{EQN. 1}$$

Where L is the inductance in Henries (H), $\mu$ is the permeability (Wb/A*m), N is the number of turns in the Helmholtz coil windings 645A, 645B, A is the area (m$^2$) encircled by the Helmholtz coil windings 645A, 645B, and l is the length (m) of the Helmholtz coil windings 645A, 645B. In some embodiments, to a radius 655 from the center of each coil winding 645A, 645B is equal to the length between the two coil windings 645A, 645B.

The number of turns in the Helmholtz coil windings 645A, 645B may vary in different embodiments to achieve different spacing. However, the different spacings will not alter the overall inductance of the Helmholtz coil windings 645A, 645B. For example, if the Helmholtz coil windings 645A, 645B have four turns, with a 100 cm spacing 660, and a 100 cm radius 655 from the center of the coil windings 645A, 645B, the inductance is shown by EQN. 2:

$$L = \frac{1.25E - 6(H/m) \times 4^2 \times \pi \times (0.1 \text{ m})^2}{0.1 \text{ m}} = 6.3 \text{ μH} \qquad \text{EQN. 2}$$

In some embodiments, the radius 655 from the center 650 of the Helmholtz coil windings 645A, 645B are equal. The centers of each Helmholtz coil windings 645A, 645B are also at least generally aligned with one another. The spacing 660 between the Helmholtz coil windings 645A, 645B is where the electromagnetic field is produced and where the battery pack 235 may be placed for charging.

Figure 7:
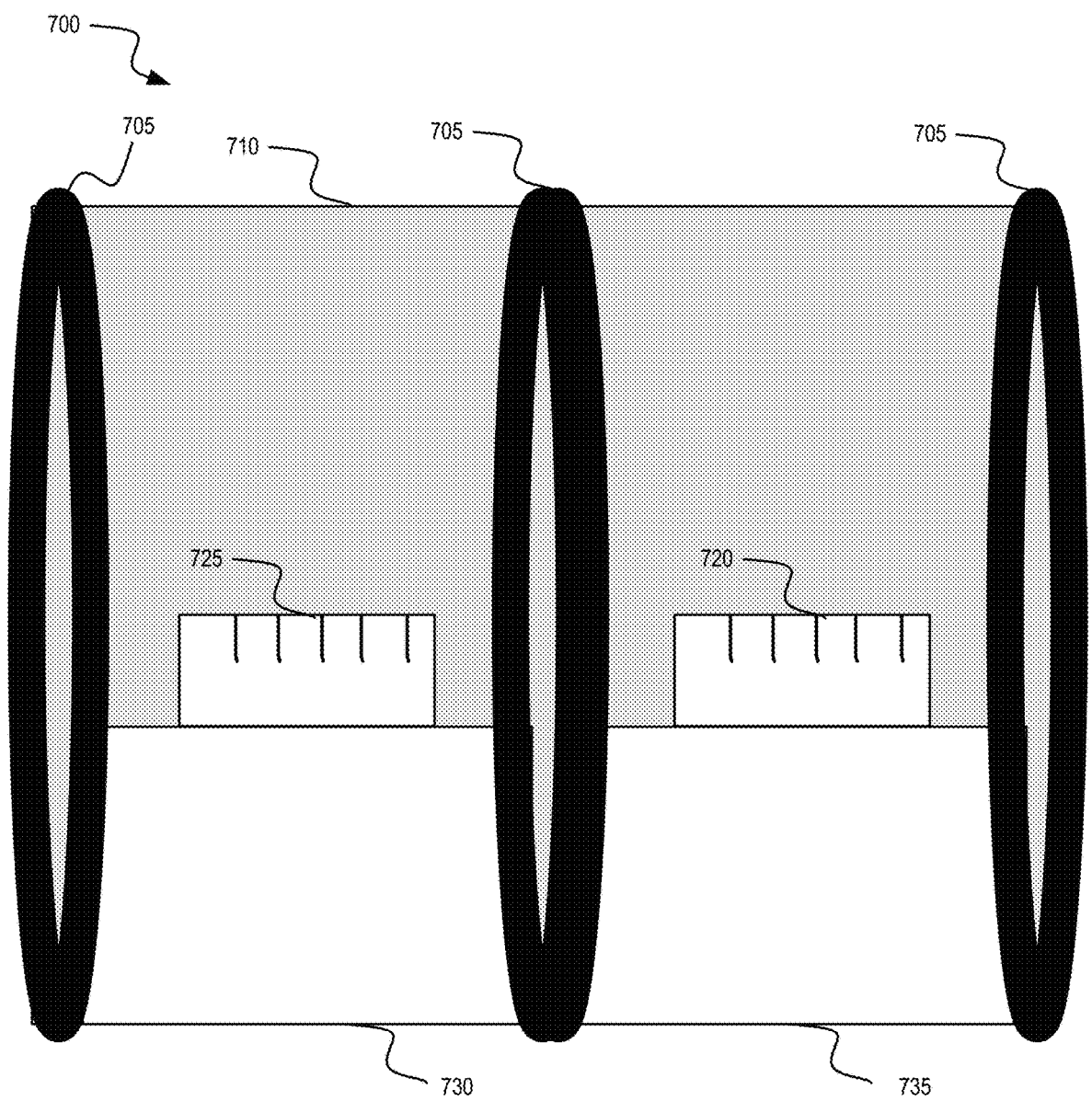
FIG. 7 is a front view of an inductive heater assembly for a multiple battery packs.

FIG. 7 illustrates a multi-pack heater assembly 700. The multi-pack heater assembly 700 includes multiple charger interfaces 720, 725 to allow simultaneous charging of at least two battery packs 235. The multi-pack heater assembly 700 includes at least three Helmholtz coil windings 705 positioned within a housing 710. The housing 710 encloses a first charging base 730, the first charging interface 725, a second charging base 735, and the second charging interface 720. The first charging base 730 and the second charging base 735 are connected in series or parallel for the multi-pack heater assembly 100. The first charging interface 725 allows at least one battery pack 235 to connect to the first charging interface 725. The second charging interface 720 allows another at least one battery pack 235 to connect to the second charging interface.

Figure 8A:
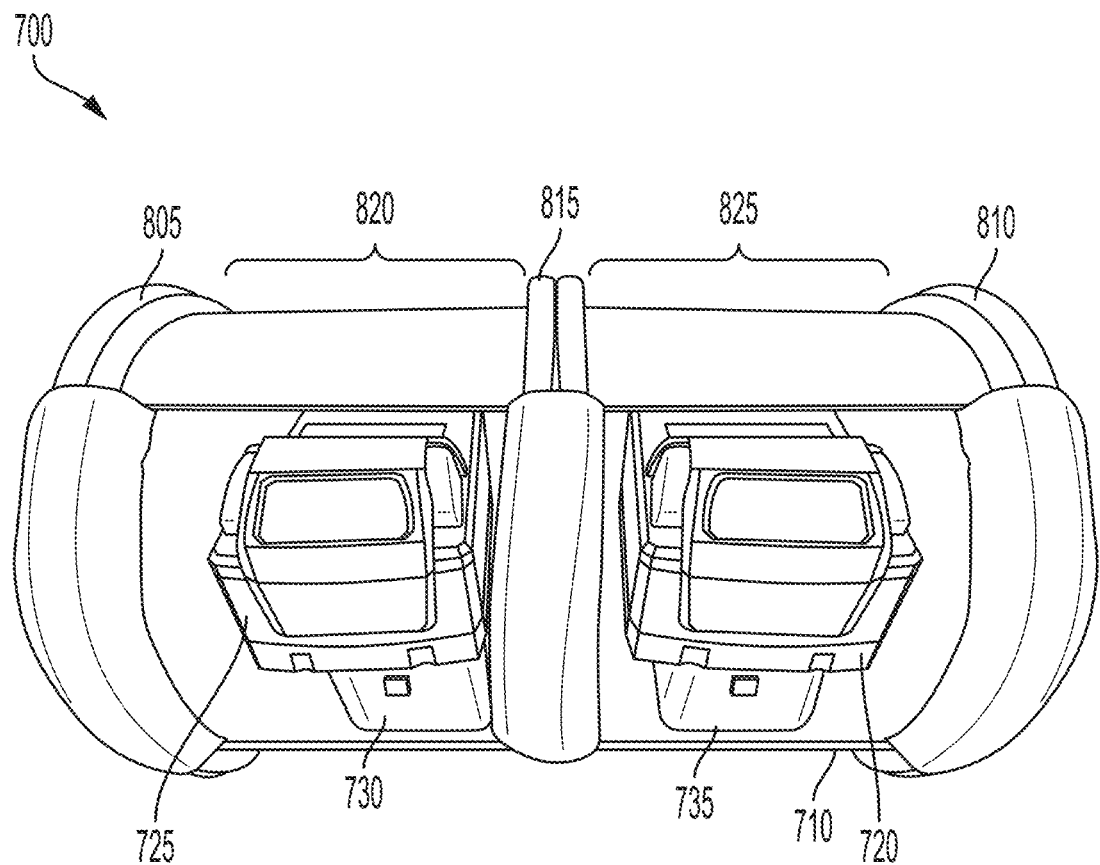
FIG. 8A is front view of multiple battery pack to be heated by the heater assembly of FIG. 7.

FIG. 8A illustrates one embodiment of the multi-pack heater assembly 700. The housing 710 wraps around the charging interfaces 720, 725 and the charging bases 730, 735. The Helmholtz coil includes coil windings 805, 810, 815, and Helmholtz coil windings 805, 810, 815 are evenly spaced withing the housing 710 to allow the production of a uniform electromagnetic field to flow through the housing 710 and through battery packs mounted to the charging interface 720, 725. The Helmholtz coil of FIG. 8A includes a first stage 820 and a second stage 825.

Figure 8B:
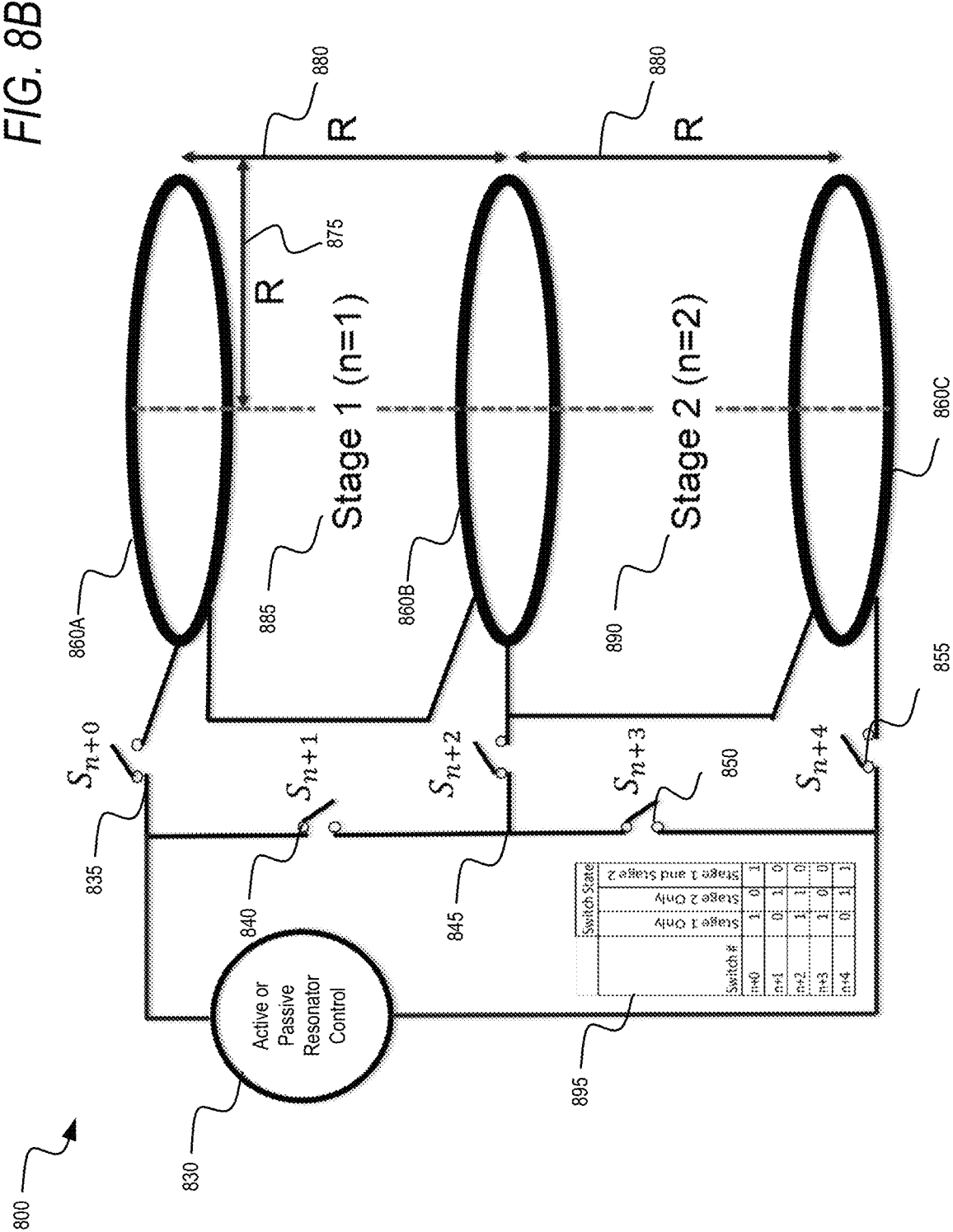
FIG. 8B is a schematic of the multi-stage Helmholtz coil.

FIG. 8B illustrates a multi-pack schematic diagram 800. The multi-pack schematic diagram 800 shows, in some embodiments, an active resonator control 830. The active resonator control 830 can actively control an operating frequency through the use of pulse-width-modulation. In other embodiments, the schematic diagram 800 shows a passive resonator control 830. The passive resonator control 830 can passively switch different capacitor banks in series or parallel with the Helmholtz coil windings 860A, 860B, 860C. This allows the Helmholtz coil windings 860A, 860B, 860C to be operated at the Helmholtz coil windings 860A, 860B, 860C's natural, resonating frequency. In other embodiments, a Zero Voltage Switching (ZVS) method can be implemented. Using the ZVS method would minimize the switching losses within the resonator control 830.

The multi-pack implementation 700 requires control of multiple stages of the Helmholtz coil. Within the multi-pack implementation 700, there is, at least, a first switch $S_{n+0}$ 835, a second switch $S_{n+1}$ 840, a third switch $S_{n+2}$ 845, a fourth switch $S_{n+3}$ 850, and a fifth switch $S_{n+4}$ 855. Each switch's state determines the Stage in which the heater assembly 700 operates. A Boolean table 895 demonstrates the state of each switch and its corresponding Stage output. For example, to implement Stage 1 885 only, the first switch $S_{n+0}$ 835, the third switch $S_{n+2}$ 845, and the fourth switch $S_{n+3}$ 850 values would all need to be 1 (or ON). To implement Stage 2 890 only, the second switch $S_{n+1}$ 840, the third switch a third switch $S_{n+2}$ 845, and the fifth switch $S_{n+4}$ 855 values would each need to be 1 (or ON). To implement both Stage 1 885 and Stage 2 890, the first switch $S_{n+0}$ 835 and the fifth switch $S_{n+4}$ 855 would both need to be 1 (or ON).

The Helmholtz coils 860A, 860B, 860C are spaced 880 equal to ensure uniform electromagnetic flow through both Stage 1 885 and Stage 2 890. As with the single pack implementation of the heater assembly 100, the radius 875 from the center of each of the Helmholtz coil windings 860A, 860B, 860C is equal. The multi-pack heater assembly 700 uses a combined electromagnetic field that allows for uniform heating of the battery packs 235.

FIGS. 9A-9H illustrate an enclosure or housing 900 that includes a lower housing portion 905 and an upper housing portion 910. The enclosure 900 includes, for example, one or more inductive heater assemblies 100 internal to the enclosure 900. In some embodiments, the upper housing portion 910 is pivotable about one or more hinges such that the interior of the enclosure 900 can be accessed without completely removing the upper housing portion 910. The upper housing portion 910 is configured to engage the lower housing portion 905 to create a substantial air and water tight seal. Such a seal between the lower housing portion 905 and the upper housing portion 910 aides in preventing air inside the enclosure 900 from being affected by air outside of the temperature controlled enclosure 900.

The enclosure 900 also includes a power input terminal 915. In some embodiments, the power input terminal 915 is an AC power input terminal. In other embodiments, the power input terminal 915 is a DC power input terminal or includes a battery pack interface for receiving one or more battery packs. The upper housing portion 910 includes an interface 920 that is configured to allow the enclosure 900 to physically engage or mate with one or more additional devices that have complimentary interfaces.

Figure 9A:
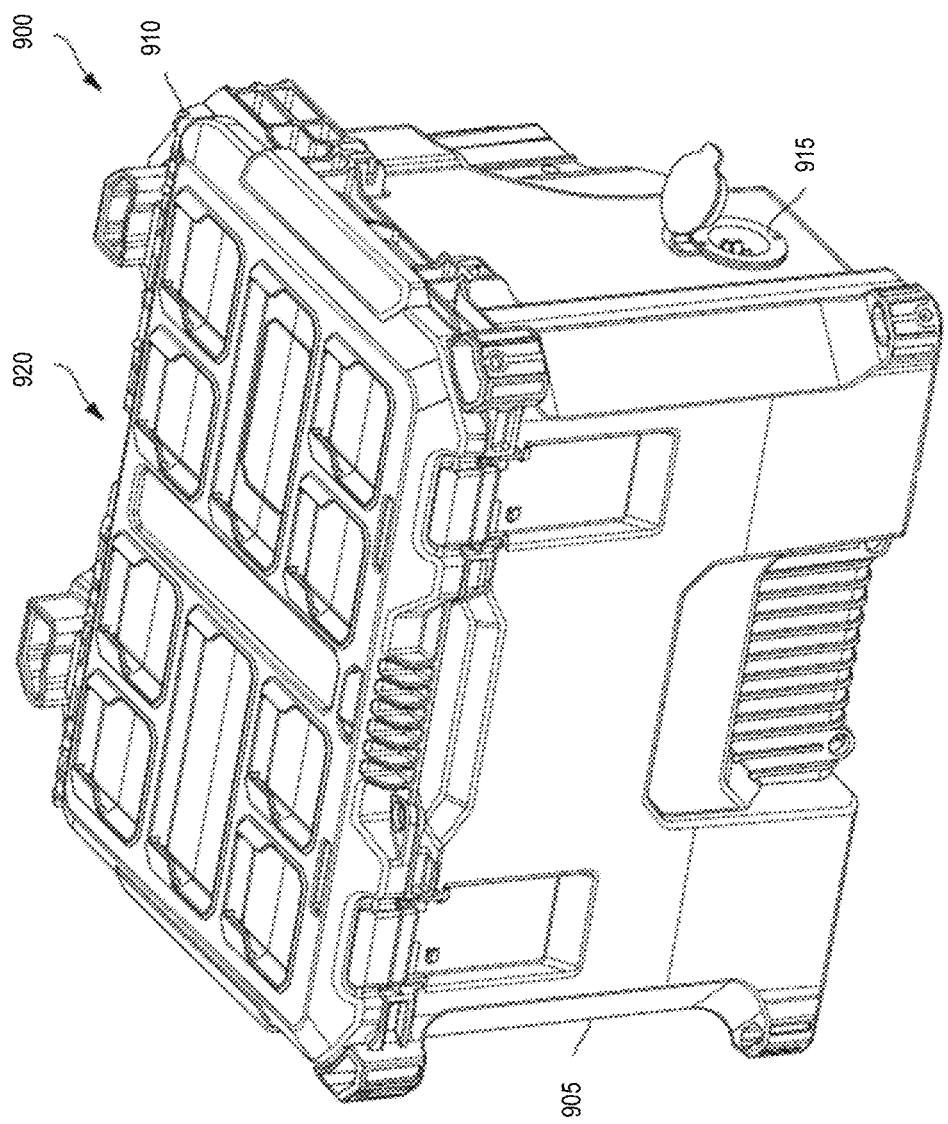
FIGS. 9A, 9B, 9C, 9D, 9E, 9F, 9G, and 9H illustrate an enclosure including the inductive heating system of FIG. 1 or FIG. 7, according to embodiments described herein.
Figure 9B:
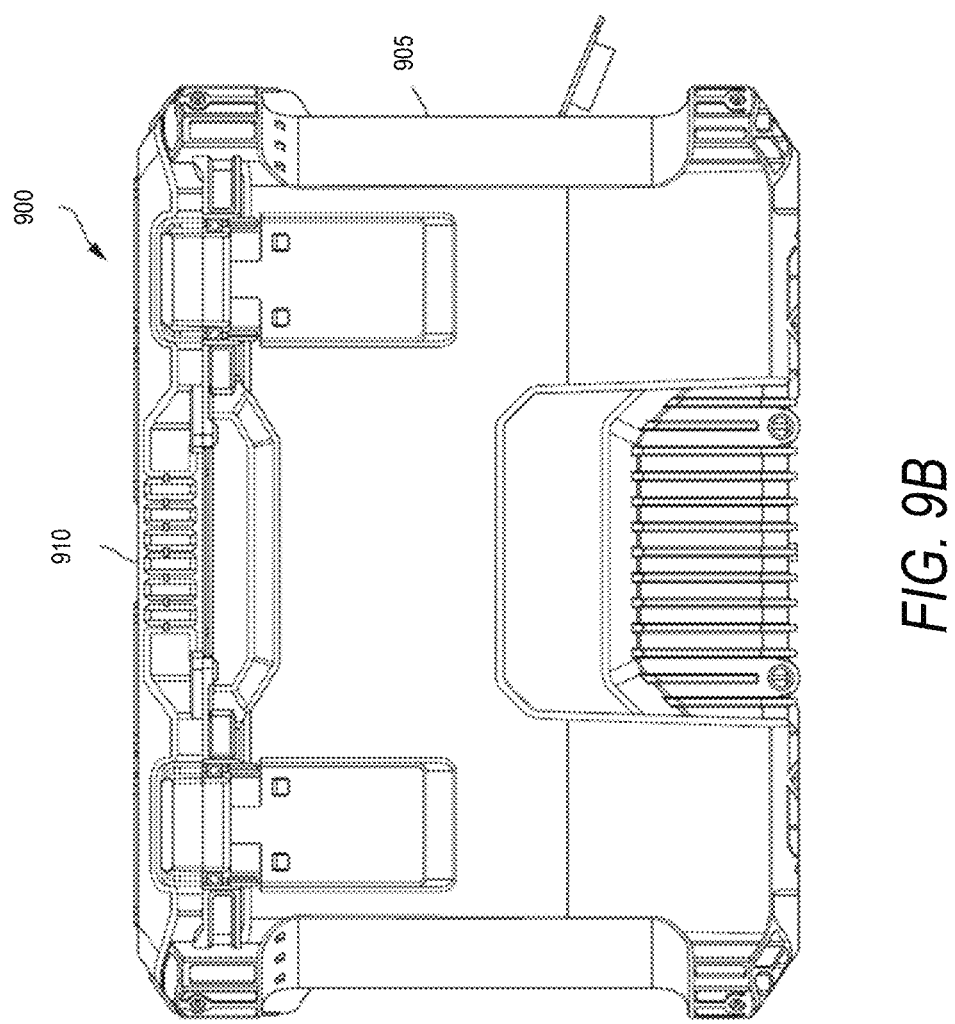
Figure 9C:
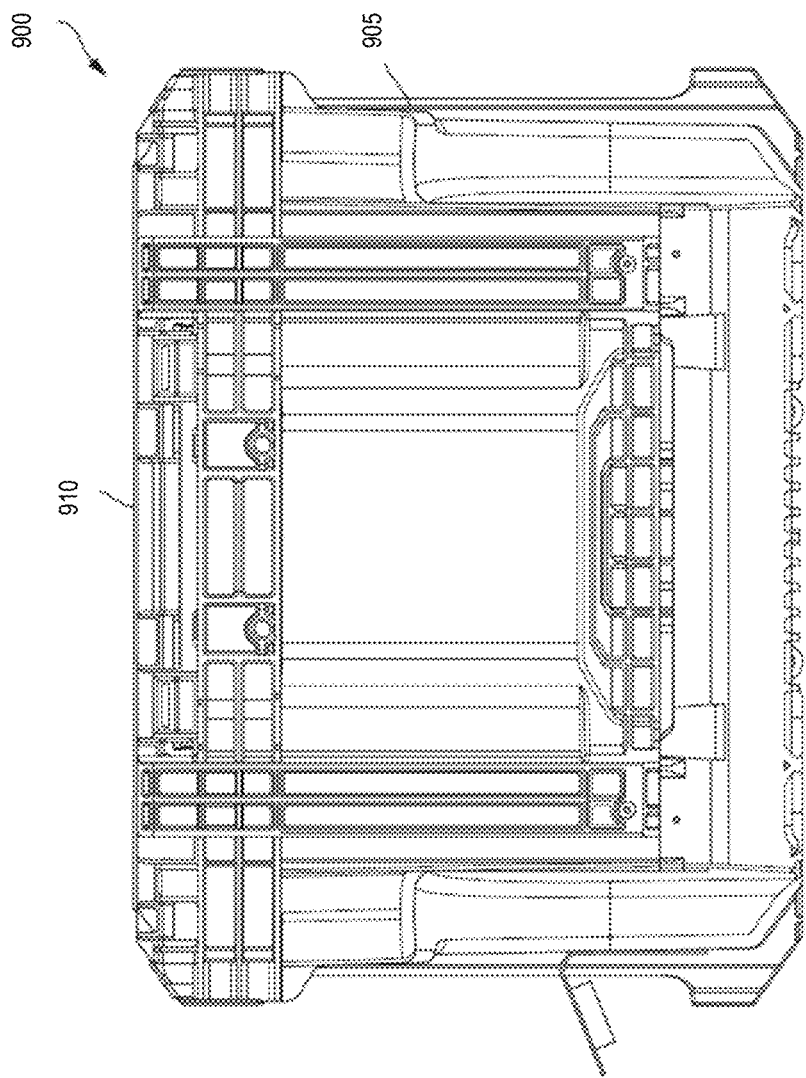
Figure 9D:
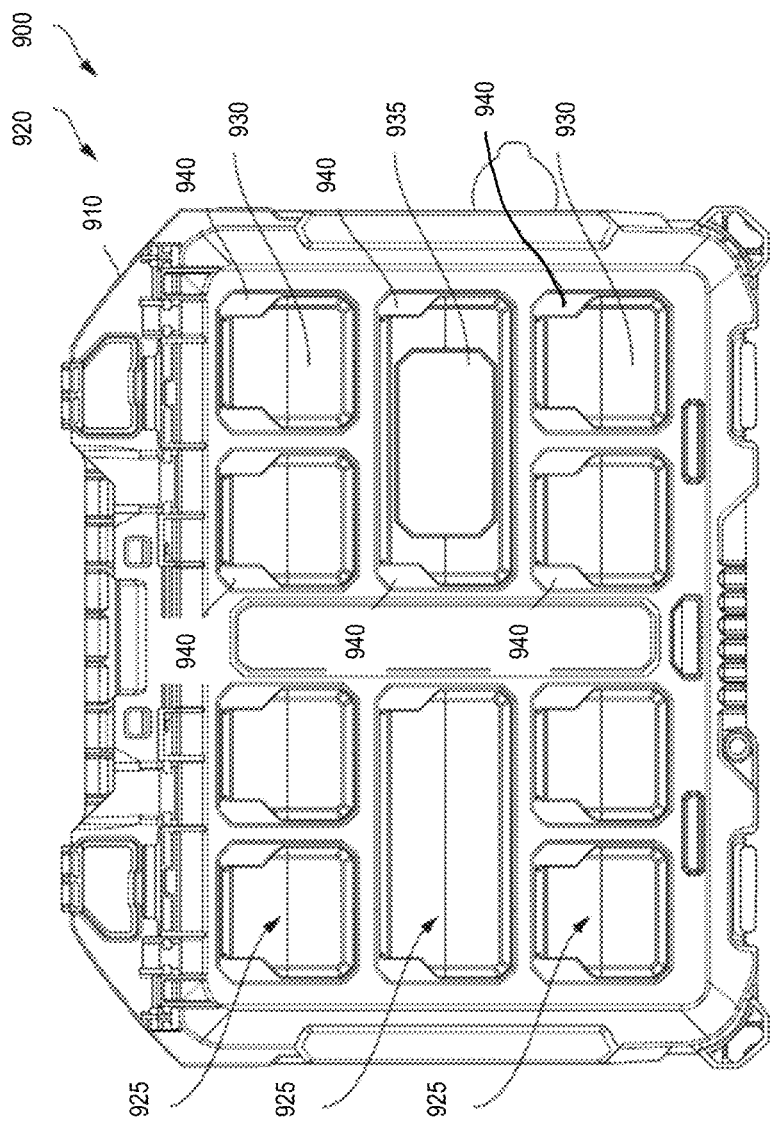
Figure 9E:
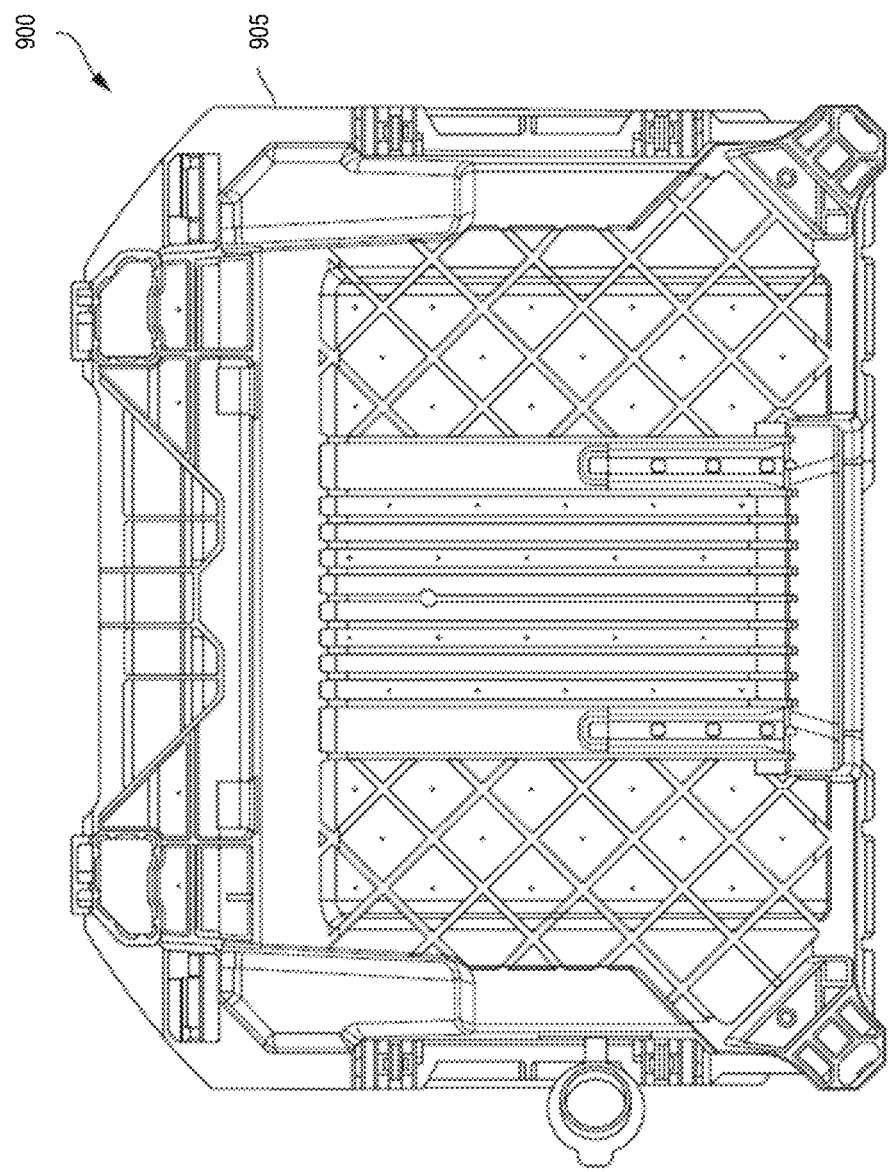
Figure 9F:
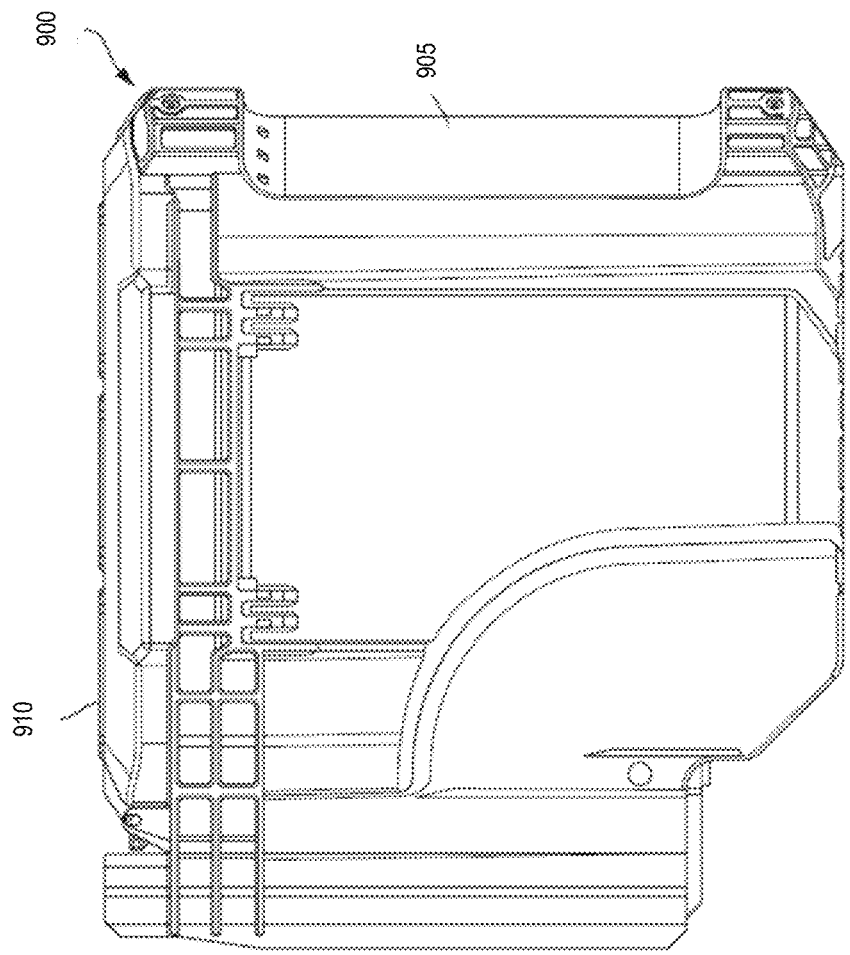
Figure 9G:
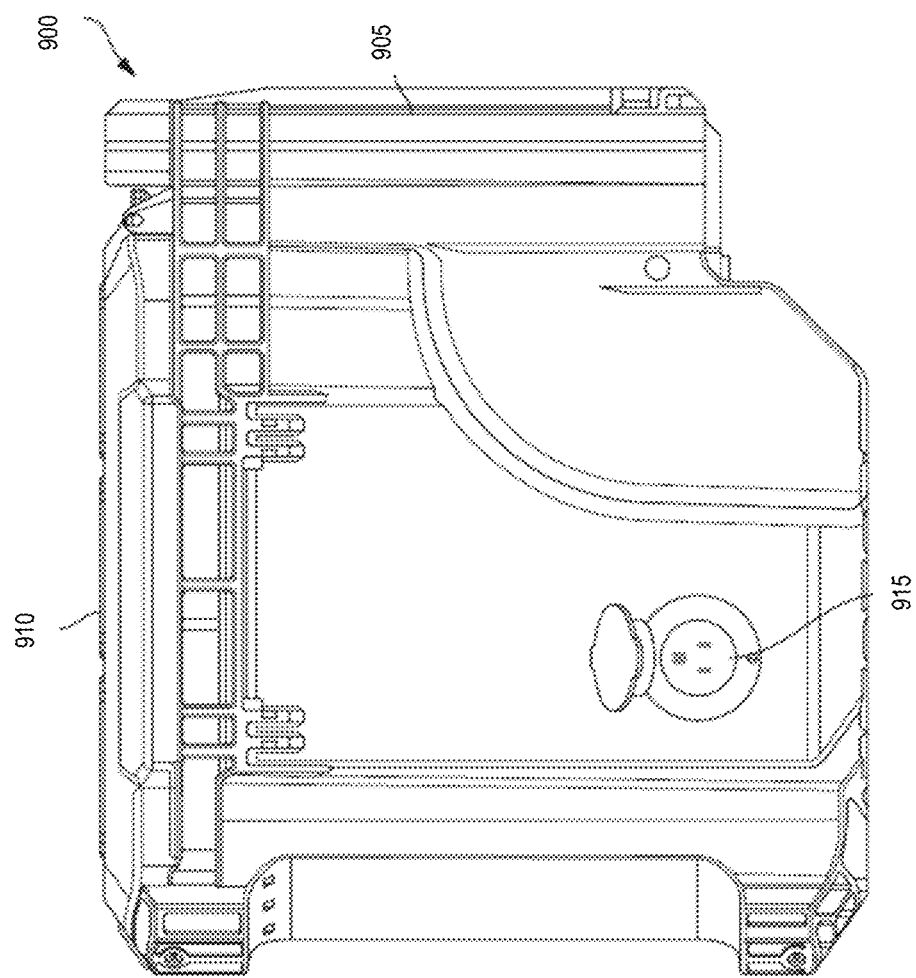

With reference to FIG. 9D, the interface 920 of the upper housing portion 910 includes a plurality of connection recesses 925 that receive and cooperate with projections from a complementary interface. The connection recesses 925 include two rows of two small recesses 930 and one row of large recesses 935. In other embodiments, the upper housing portion 910 can include different numbers or patterns of connection recesses 925. An interface projection or wing 940 extends into each connection recess 925 on opposite sides of the connection recess 925 from one end of the connection recess 925. Each of the wings 940 has a length that extends approximately half the connection recess 925 top define a first portion of the connection recess 925 and a second portion opposite the wings 940, which remains open. In other embodiments, each of the wings 940 has a length that extends less than half the connection recess 925.

Figure 9H:
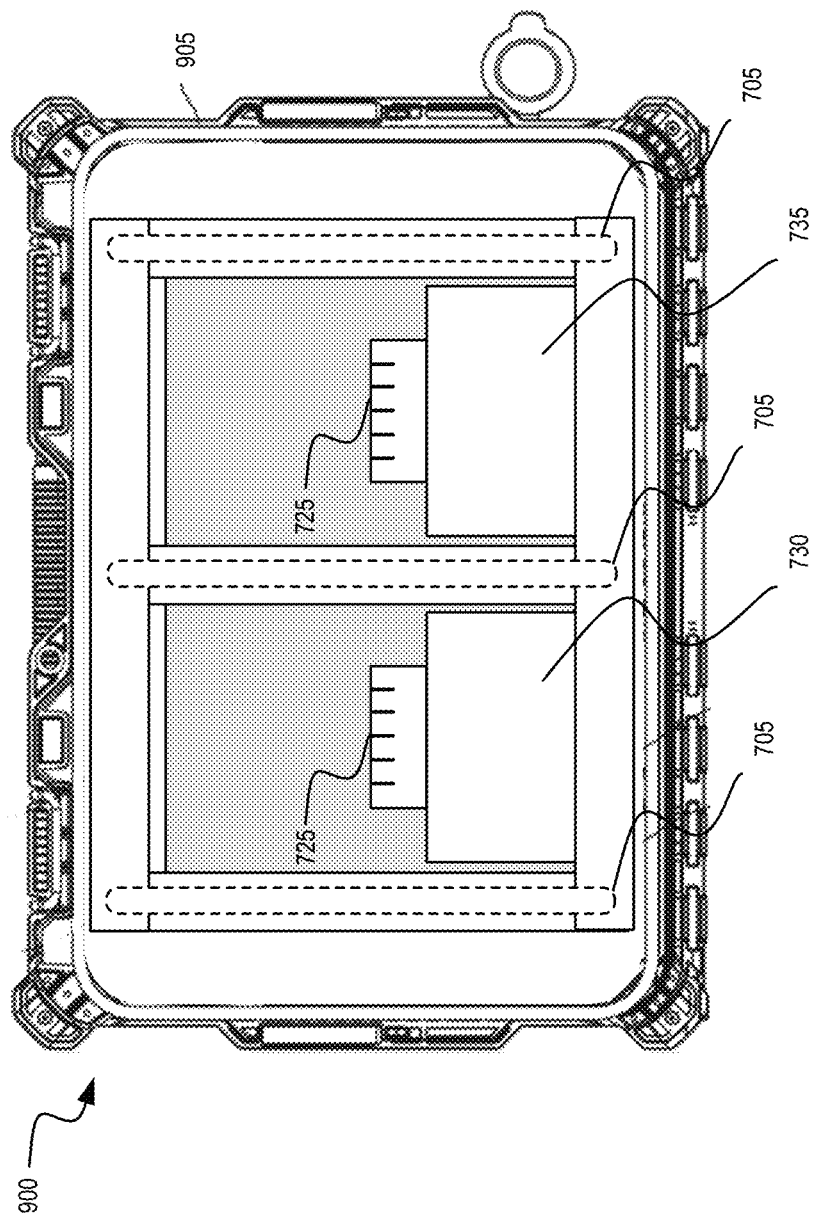

FIG. 9H illustrates the enclosure 900 with the upper housing portion 910 removed. The enclosure 900 includes at least three coil portions and at least two charging bases 730, 735 that are each configured to receive a power tool battery pack. In some embodiments, the charging bases 730, 735 are integrated with the enclosure 900. As a result, the charging bases 730, 735 are mechanically and electrically connected to the enclosure 900 and configured to mechanically and electrically connect to a power tool battery pack. In some embodiments, the charging bases 730, 735 and coil windings 705 are permanently affixed to the enclosure 900. In other embodiments, the charging bases 730, 735 and coil windings 705 are removably affixed to the enclosure 900.

Figure 10:
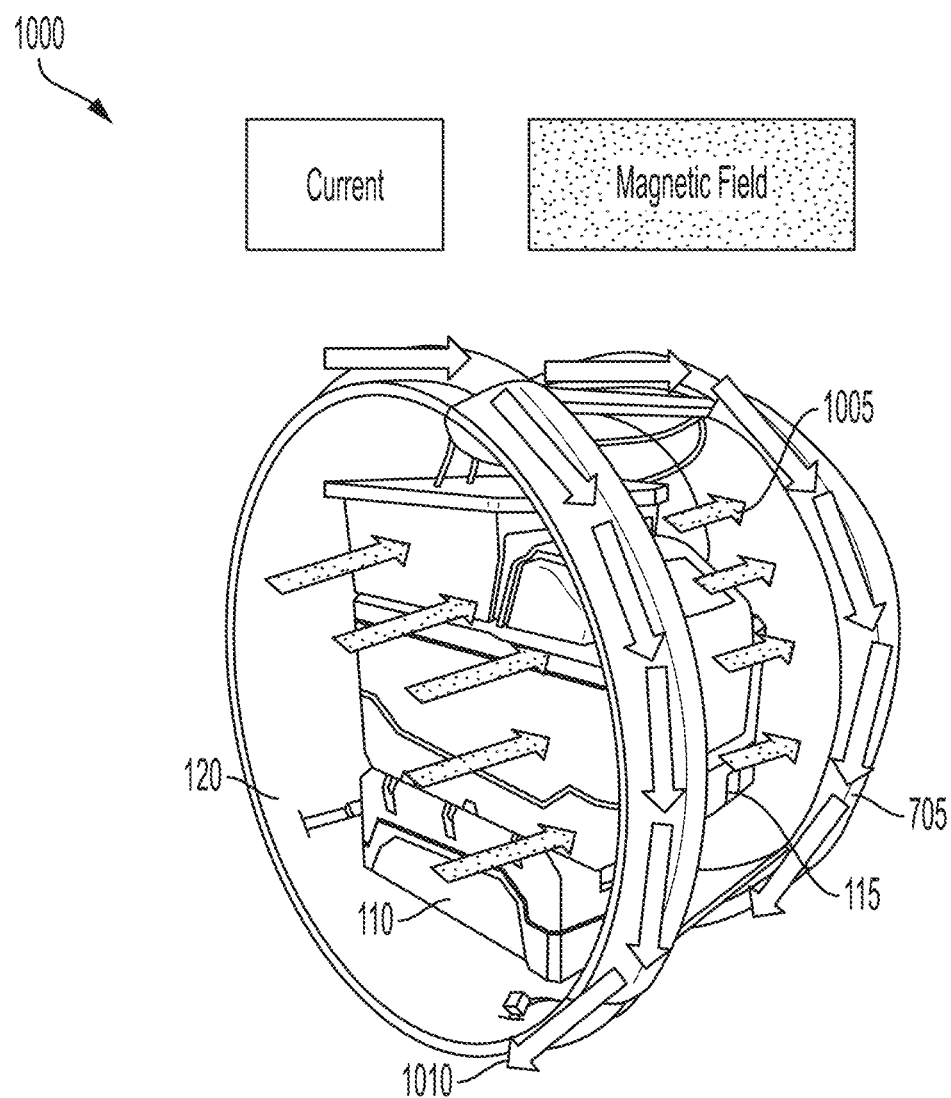
FIG. 10 illustrate current flow direction and magnetic field direction in a Helmholtz coil.

FIG. 10 illustrates the directions of both a current flow 1010 and a magnetic field 1005 with respect to the heater assembly 1000. The charging base 110 sits within the housing 120, as in earlier embodiments. The charging interface 115 receives the battery pack 235 and positions the battery pack between the two Helmholtz coil windings 705. When the charging method is implemented, the current begins to flow through the Helmholtz coil windings 705 wrapping around the housing 120 and the battery pack 235. The current flow 1010 produces the magnetic field 1005 which travels through the housing 120 and the battery pack 235. In this embodiment, the magnetic field travels in a left to right direction.

Figure 11:
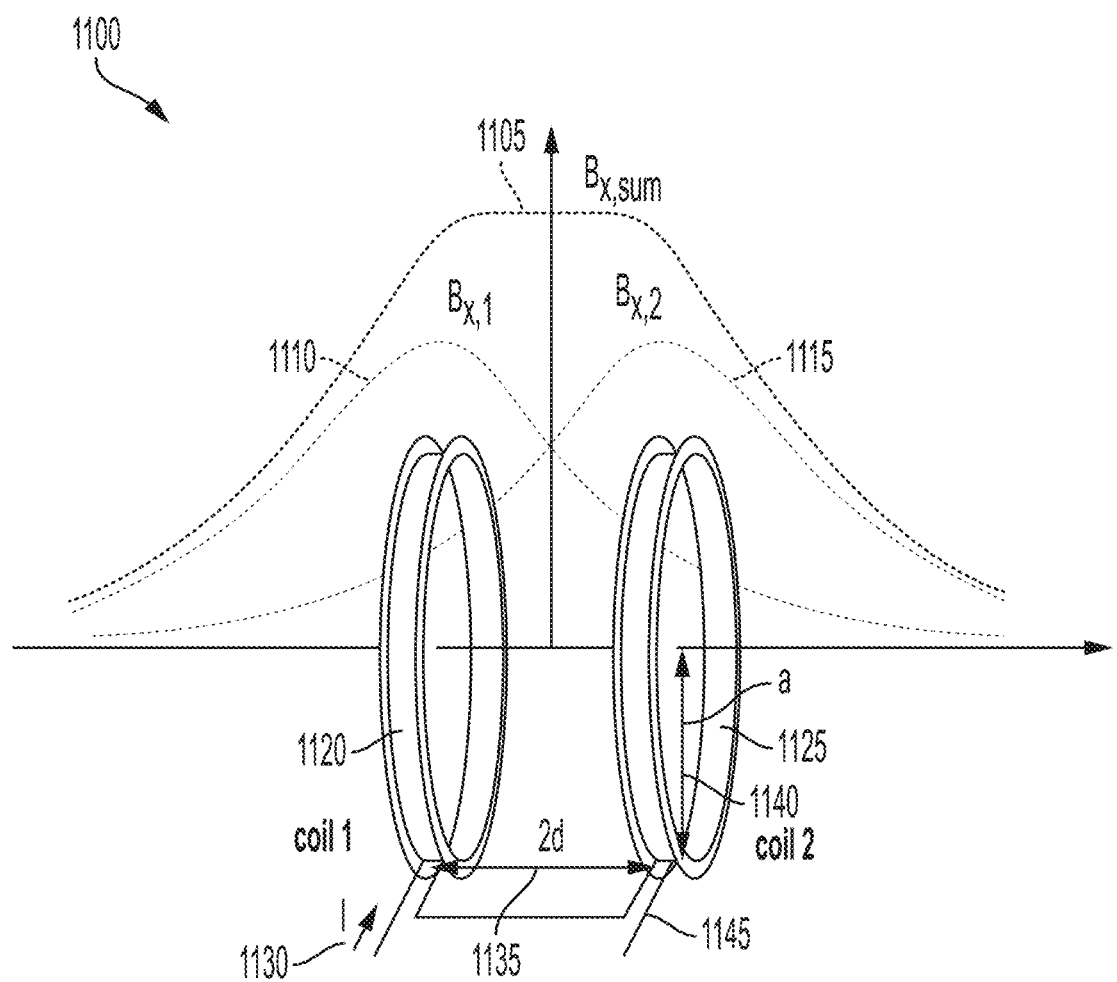
FIG. 11 is a diagram of the magnetic field strength with respect to the single-pack assembly of FIG. 1.

FIG. 11 illustrates a diagram of different directional movements within the heater assembly 1100. A first Helmholtz coil winding 1120 includes a first current 1130 (denoted as I) that travels throughout the first Helmholtz coil winding 1120. The first Helmholtz coil winding 1120 produces a first electromagnetic field $B_{x,1}$ 1110. The diagram of flow for the first electromagnetic field $B_{x,1}$ 1110 shows the fluctuation of the electromagnetic field with respect to the first Helmholtz coil winding 1120 along the x-axis that lies a distance a 1140 within the center of the first Helmholtz coil winding 1120. A second Helmholtz coil winding 1125 is placed at a distance 2d 1135 from the first Helmholtz coil winding 1120. In some embodiments, distance 2d is equal to the distance 2a. The second Helmholtz coil winding 1125 includes a second current 1145 that travels through the second Helmholtz coil winding 1125. The second Helmholtz coil winding 1125 produces a second electromagnetic field $B_{x,2}$ 1115. The diagram of flow for the second electromagnetic field $B_{x,2}$ 1115 shows the fluctuation of the electromagnetic field with respect to the second Helmholtz coil winding 1125 along the x-axis that lies at the distance a 1140 within the center of the second Helmholtz coil winding 1125. The combination of the first electromagnetic field $B_{x,1}$ 1110 related to the first Helmholtz coil winding 1120 and the second electromagnetic field $B_{x,2}$ 1115 related to the second Helmholtz coil winding 1125 creates a uniform summed electromagnetic field between the Helmholtz coil windings 1120, 1125. The summation of the first electromagnetic field $B_{x,1}$ and the second electromagnetic field $B_{x,2}$ creates a total electromagnetic field $B_{x,sum}$ 1105 that fluctuates with respect to both the first Helmholtz coil winding 1120 and the second Helmholtz coil winding 1125 along the x-plane.

Figure 12:
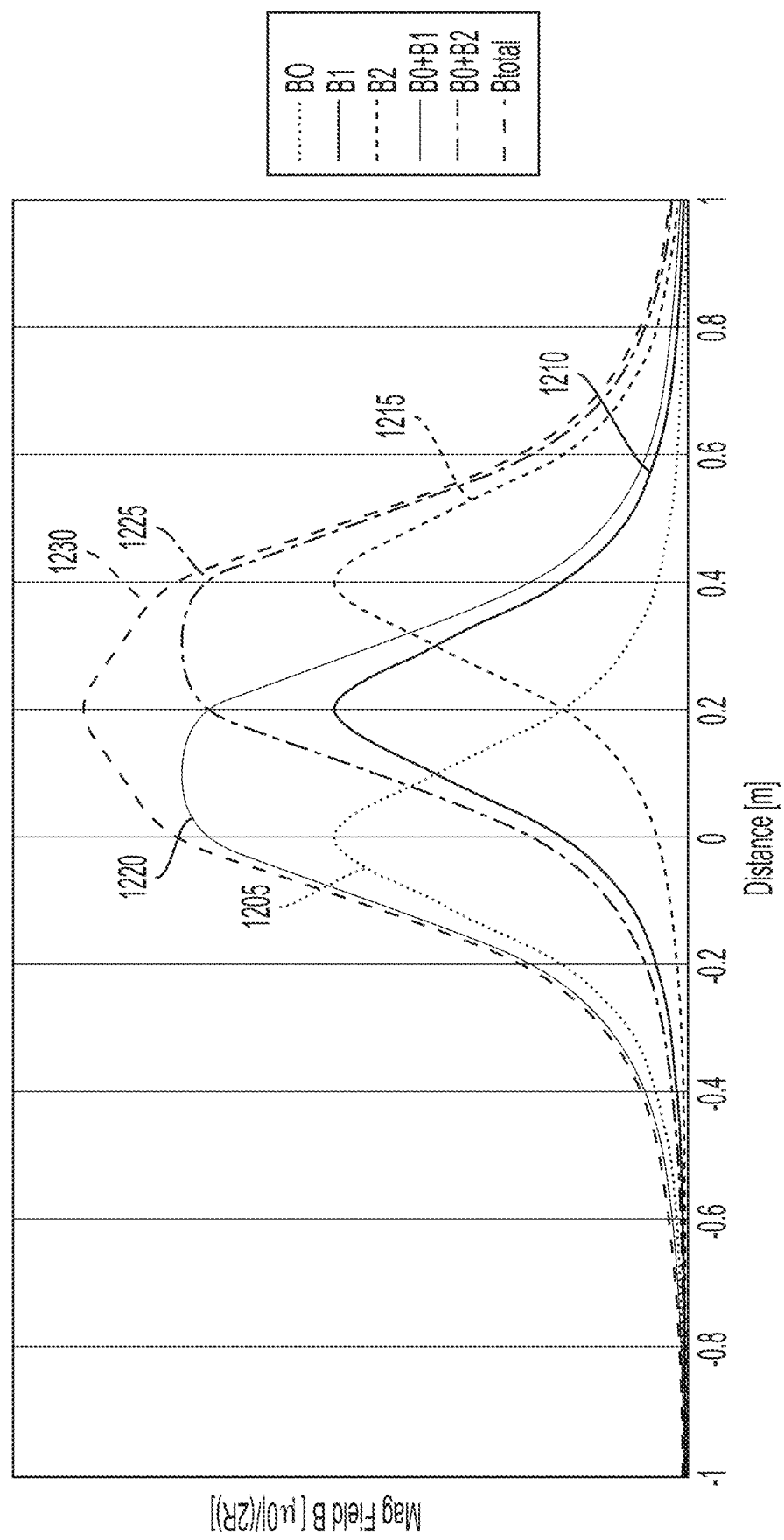
FIG. 12 is a diagram of the magnetic field strength within the multi-pack assembly of FIG. 7.

FIG. 12 illustrates a diagram of the magnetic field of a multi-pack heater assembly 1200. The total electromagnetic field $B_{total}$ 1230 is found through summing each of the electromagnetic fields at each of a first coil winding, a second coil winding, and a third coil winding. For the first coil winding, the first electromagnetic field $B_0$ 1205 value from the first coil winding is summed with the second electromagnetic field $B_1$ 1210 value from the second coil winding for a first total sum $B_0+B_1$ 1220. The second electromagnetic field $B_1$ 1210 is summed with a third electromagnetic field 1215 value from the third coil winding for a second total sum $B_1+B_2$ 1225. The first total sum 1220 and the second total sum 1225 are added for one total sum 1230 of the entire multi-pack heater assembly 1200. The total sum 1230 creates a uniform flow of electromagnetic field that travels through the multi-pack heater assembly 1200.

Figure 13:
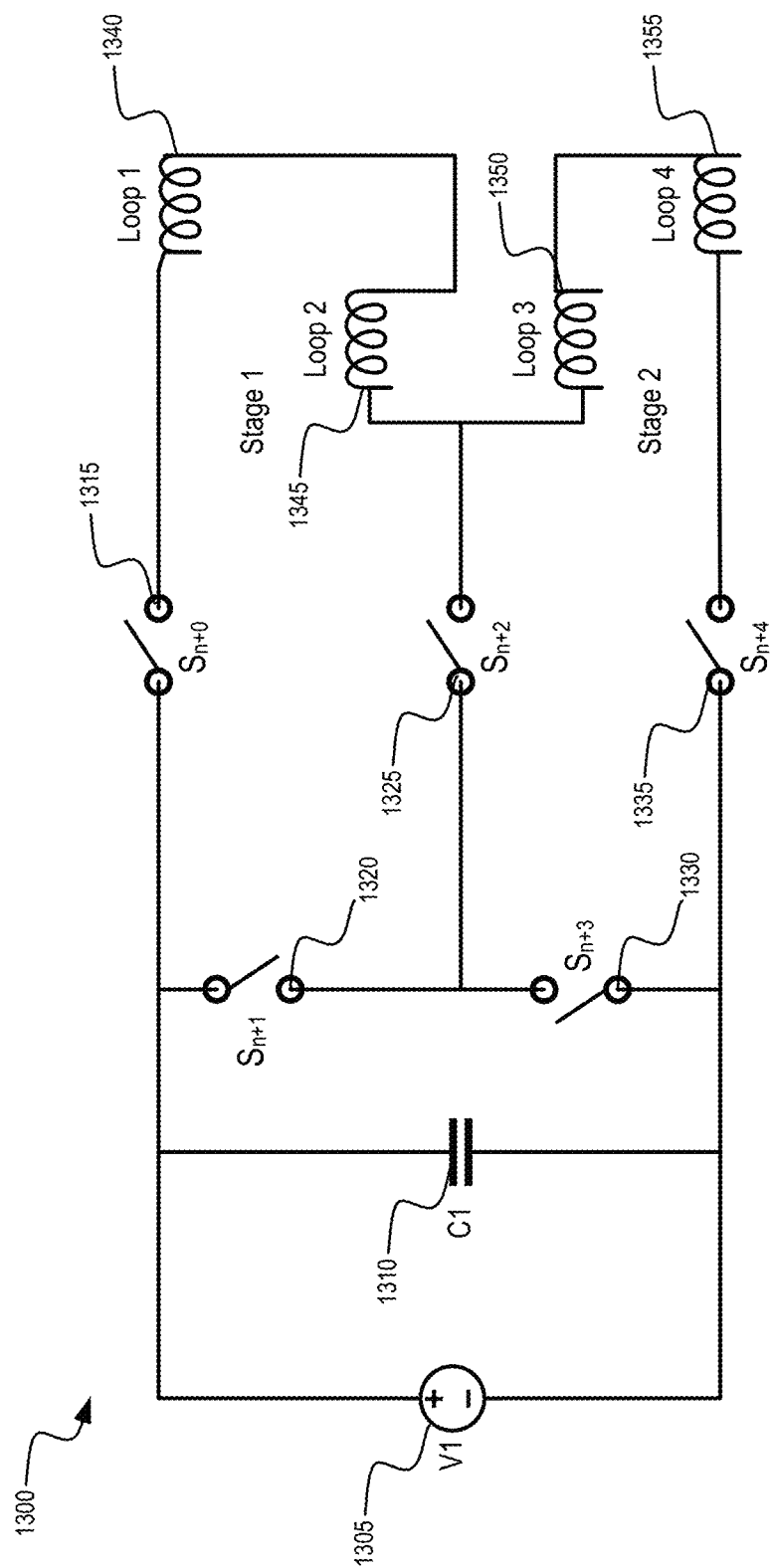
FIG. 13 is a schematic of a multi-stage heater assembly.

FIG. 13 illustrates a schematic of different operation modes for a heater assembly 1300 (e.g., a two-stage heater assembly). The schematic 1300 shows a power source 1305 that delivers power to a capacitor 1310. The heater assembly 1300 includes of a first switch $S_{n+0}$ 1315, a second switch $S_{n+1}$ 1320, a third switch $S_{n+2}$ 1325, a fourth switch $S_{n+3}$ 1330 and a fifth switch $S_{n+4}$ 1335. To implement Stage 1 only, the first switch $S_{n+0}$ 1315, the third switch $S_{n+2}$ 1325, and the fourth switch $S_{n+3}$ 1330 values would all need to be 1 (or ON), and travel through Loop 1 1340 and Loop 2 1345. To implement Stage 2 only, the second switch $S_{n+1}$ 1320, the third switch a third switch $S_{n+2}$ 1325, and the fifth switch $S_{n+4}$ 1335 values would each need to be 1 (or ON). To implement both Stage 1 and Stage 2, the first switch $S_{n+0}$ 1315 and the fifth switch $S_{n+4}$ 1335 would both need to be 1 (or ON), and travel through Loop 3 1350, and Loop 4 1355.

Figure 14:
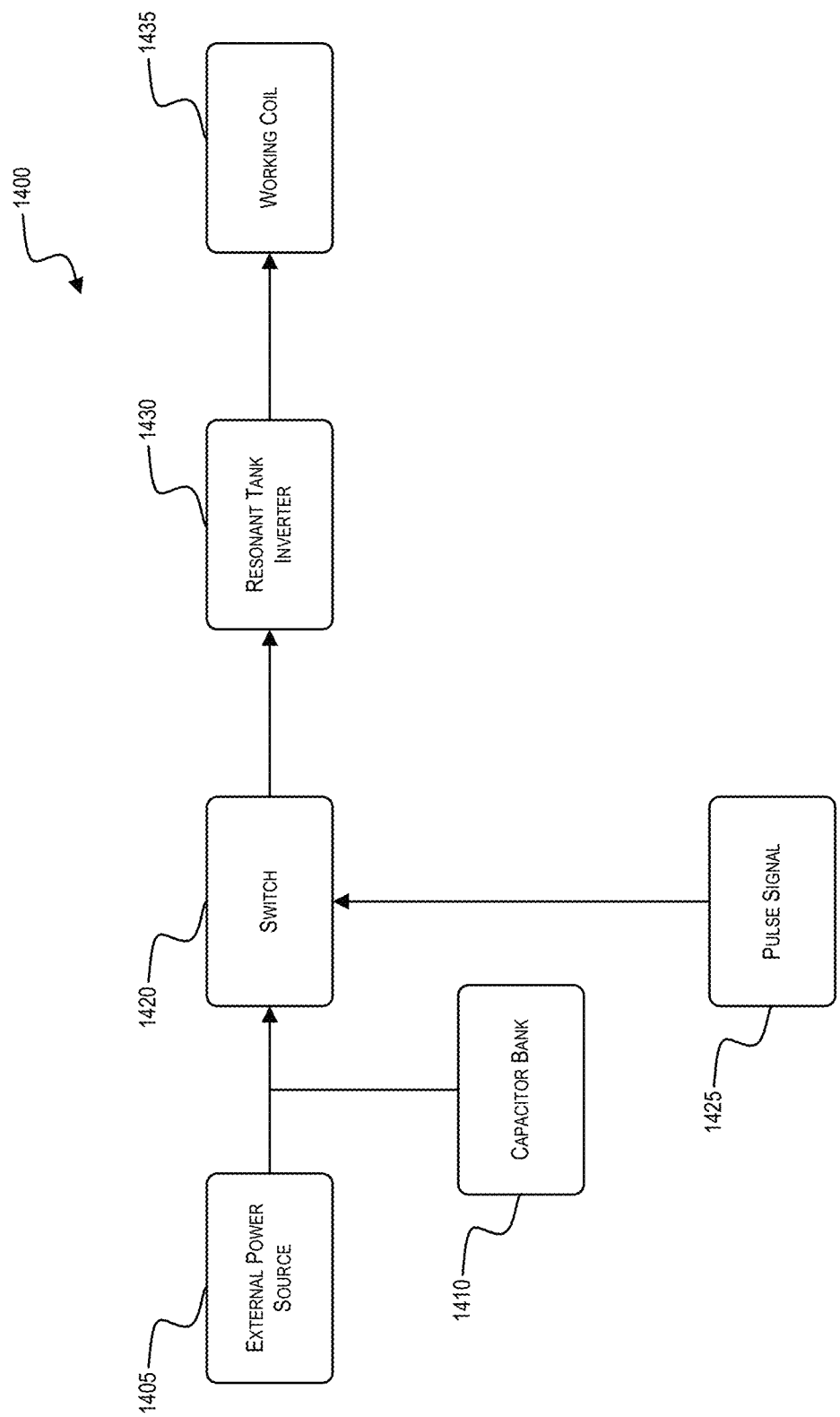
FIG. 14 is a block diagram of a circuit of the heater assembly of FIG. 1 or FIG. 7

FIG. 14 illustrates a block diagram of the circuit 1400 of any heater assembly described herein. Power from an external power source 1405 is supplied to charge a capacitor bank 1410. External power is also supplied to a switch 1420 configured to switch on and off based on a pulse signal 1425. When the pulse signal 1425 pulse to "high," the switch 1420 turns to the on state and external power from the external power source 1405 is delivered to a resonant inverter or resonator circuit 1430 and a coil section 1435. In other embodiments, the switch 1420 may be driven on the inverse of the pulse signal 1425 to minimize noise (e.g., the switch 1420 turns to the on state when the pulse signal 1425 pulses to "low"). In some embodiments, the resonant inverter 1430 is configured as a half bridge inverter including a plurality of circuit elements, such as transistors, diodes, resistors, etc. In some embodiments, the resonant inverter adjusts output power based on input voltage and the output frequency depends on the tuned resonance of an inductive coil and a capacitance. For example, in some embodiments, the resonant inverter 1430 operates at approximately 70 kHz.

When an external power is supplied through the switch 1420, power is delivered to the coil section 1435 including of a number of individual conductors. This coil section 1435 may be configured as, for example, the coil windings 645A, 645B and used to inductively heat a battery pack 235.

When the battery pack 235 has reached a predetermined temperature threshold, external power may be delivered through the switch 1420 or resonant inverter 1430 to charge the battery pack 235. When the pulse signal 1425 turns the switch 1420 to the off state, all charging and heating of the battery pack 235 ceases.

Operation of the heater assembly 100 may be controlled and executed by the controller of the battery pack 235, of the charging base 110, and/or of the heater assembly 100. In the illustrated embodiment, the heater controller monitors communication between the battery pack 235 and the charging base 110 to determine when heating is appropriate or required. In operation, when a battery pack 235 is connected to the heater assembly 100, the temperature of the battery pack 235 is determined and evaluated against the charging temperature threshold. If the temperature exceeds the threshold, the heater assembly 100 operates to provide power from the charging base 110 to the battery pack 235 to charge the battery cells 300. Charging will continue until completion (e.g., full charge of the battery pack 235, removal of the battery pack 235, a fault condition, etc.).

If the temperature of the battery pack 235 is determined to be below or equal to the charging temperature threshold, the heater assembly 100 is operated to inductively heat the battery pack before charging. Current is supplied to the coil windings 1435, and the produced magnetic field generates eddy currents to heat each battery cell 300. During heating, the temperature of the battery pack 235 is monitored periodically. The monitoring period may be set (e.g., 5 minutes) or may change based on the temperature of the battery pack 235 alone or compared to the threshold (e.g., 5 minutes for a low temperature or large difference [15° C. or more; 1 minute for a higher temperature or smaller difference [5° C. or less]).

When the temperature of the battery pack 235 exceeds the charging temperature threshold, charging may begin as described above. The heater assembly 100 may continue to heat the battery pack 235 until the temperature of the battery pack 235 exceeds the charging temperature threshold by a certain amount (e.g., about 3° C.). The heater assembly 100 may then stop heating the battery pack 235.

During or after charging, the temperature of the battery pack 235 may continue to be monitored. If the temperature does not exceed the charging temperature threshold, charging will be ceased. If there is not a fault condition, the heater assembly 100 will be operated to heat the battery pack 235 until the temperature exceeds the charging temperature threshold, and charging will be reinitiated. The heater assembly 100 may also be operated during charging or after charging if the temperature of the battery pack 235 does not exceed a maintenance temperature threshold above the charging temperature threshold.

In the heater assembly 100 a high frequency current (e.g., greater than 45 kHz) is provided to the coil windings 1435, thereby generating an electromagnetic field that induces eddy currents in a steel case (e.g., a 0.3 mm thick case) of the individual battery cells 300. The high frequency current prevents the generated electromagnetic field from penetrating the steel case of the individual battery cells 300 due to the "skin effect" phenomenon. This phenomenon is the tendency of an alternating electric current (AC) to become distributed over the surface of a conductor. At the surface of the conductor, the AC current density is the largest. As the AC current attempts to penetrate deeper into the conductor, the alternating current density will rapidly decrease.

The effect is modeled by the following equation:

$$\delta = \sqrt{\frac{2\rho}{\omega\mu}} \qquad \text{EQN. 3}$$

Where $\delta$ is the skin depth, $\omega$ is the angular frequency of the alternating current, $\rho$ is the resistivity of the conductor, and $\mu$ is the permeability constant.

From the equation, it is shown that the higher the frequency $\omega$ of the alternating current, the smaller the skin depth $\delta$ achieved, meaning that the interior elements of the battery cell 300 will not be affected by the induced eddy currents. Thus, the induced eddy currents will effectively raise the temperature of the battery cell 300 without damaging the internal elements or decreasing the performance of the battery cell 300.

Figure 15:
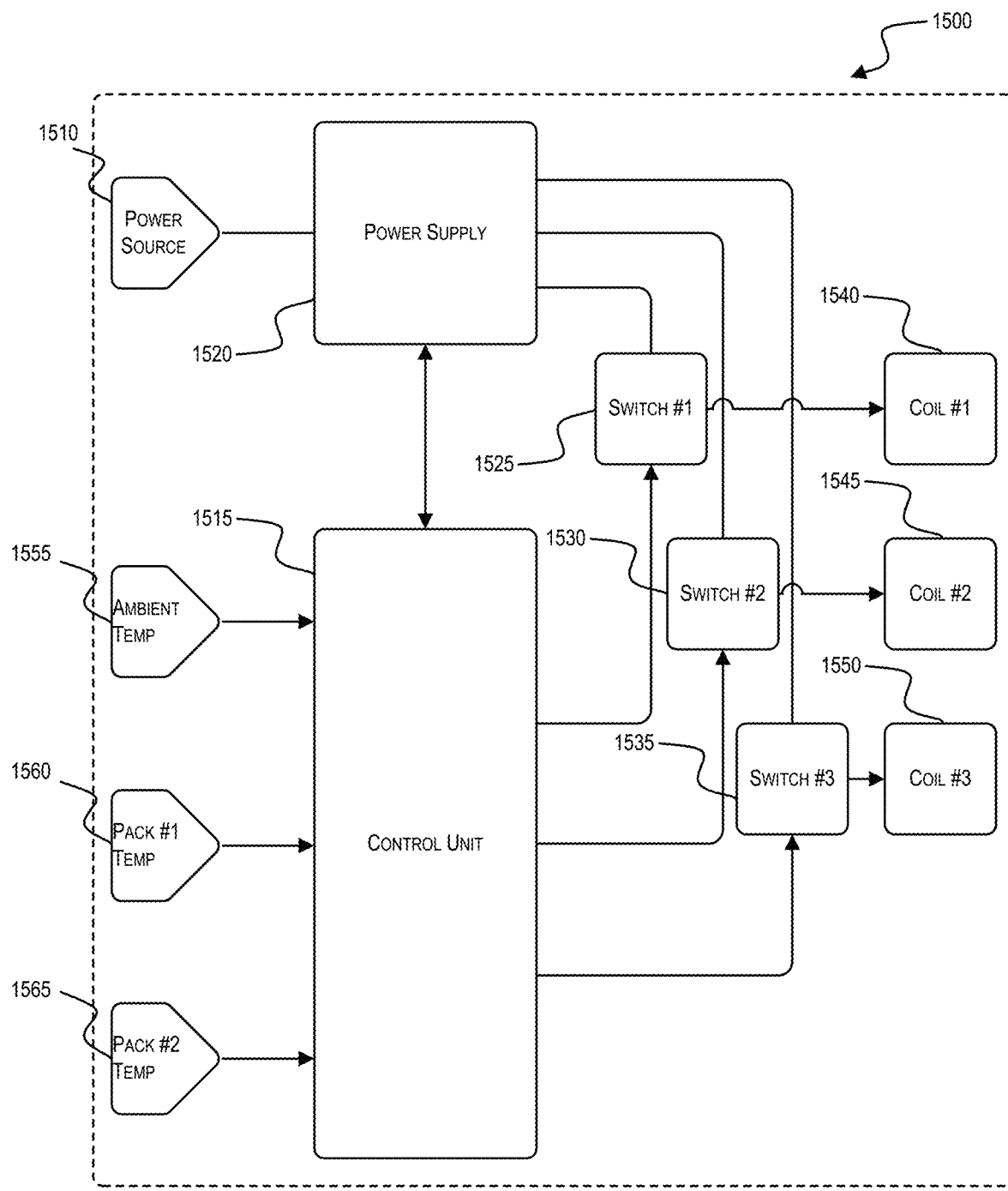
FIG. 15 is an electrical schematic diagram for the enclosure of FIGS. 9A-9H, according to embodiments described herein.

FIG. 15 illustrates an exemplary electrical circuit 1400 for an enclosure 1500, such as the enclosure 900 shown in FIGS. 9A-9H. The circuit 1400 includes many similar features to the circuit 1400 shown in and described above with respect to FIG. 14. In some embodiments, the enclosure 1500 includes one or more of the circuits 1400. The circuit 1400 for the enclosure 1500 is configured to heat one or more battery packs. The circuit 1400 includes a power source 1510, a control unit 1515, a power supply 1520, a first switch or relay 1525, a second switch or relay 1530, a third switch or relay 1535, a first heating coil 1540, a second heating coil 1545, and a third heating coil 1550. In some embodiments, the power supply 1520 is a 12V, 200 W DC power supply that receives a 120 VAC input voltage as the power source 1510. The control unit 1515 is configured to receive an input signal 1555 from an ambient temperature sensor (e.g., a negative temperature coefficient thermistor), a first temperature signal 1560 related to a first battery pack, and a second temperature signal 1565 related to a second battery pack. In some embodiments, the first temperature signal 1560 and the second temperature signal 1565 are each generated by respective infrared temperature sensors. The infrared temperature sensors can be configured to measure, for example, a temperature of a battery pack's housing. The power supply 1520 receives input power from the power source 1510 (e.g., a power input terminal 1510). In some embodiments, a capacitor bank (e.g., capacitor bank 1410 in FIG. 14) is connected to the output of the power supply 1520. The enclosure 1500 is described with respect to FIG. 15 as including three heating coils for heating two battery packs. In other embodiments, the enclosure 1500 includes additional heating coils or fewer heating coils (i.e., the single-pack) for heating a different number of battery packs.

The control unit 1515 is configured to control the first switch 1525, the second switch 1530, and the third switch 1535 to selectively provide power from the power supply. In some embodiments, a capacitor bank 1410 is connected between each of the switches 1525, 1530, 1535. The outputs of the first switch 1525, the second switch 1530, and the third switch 1535 are provided to the first heating coil 1540, the second heating coil 1545, and the third heating coil 1550, respectively, to induce eddy currents in the steel cases of the battery cells of the first and second battery packs, as previously described.

In some embodiments, the control unit 1515 is configured to control the first switch 1525, the second switch 1530, and the third switch 1535 based on one or more of the received temperature signals. For example, control unit 1515 is configured to use the input signal 1555 related to ambient temperature to determine whether one or more of the switches 1525, 1530, 1535 should be closed. In some embodiments, if an ambient temperature (e.g., internal to the enclosure 1500 and/or external to the enclosure 1500) is greater than or equal to a temperature threshold value, the control unit 1515 prevents the switches 1525, 1530, and 1535 from closing. Similarly, the control unit 1515 is configured to use the first temperature signal 1560 and the second temperature signal 1565 to determine which, if any, of the battery packs connected within the enclosure 1500 require heating. When one or more of the battery packs has a temperature below a low temperature threshold value, the control unit 1515 is configured to heat the battery pack using a combination of the first coil 1540 and the second coil 1545 or the second coil 1545 and the third coil 1550. In some embodiments, if one or more of the battery packs connected within the enclosure 1500 do not require heating, the enclosure 1500 functions as a normal battery pack charger for the battery packs.

Figure 16:
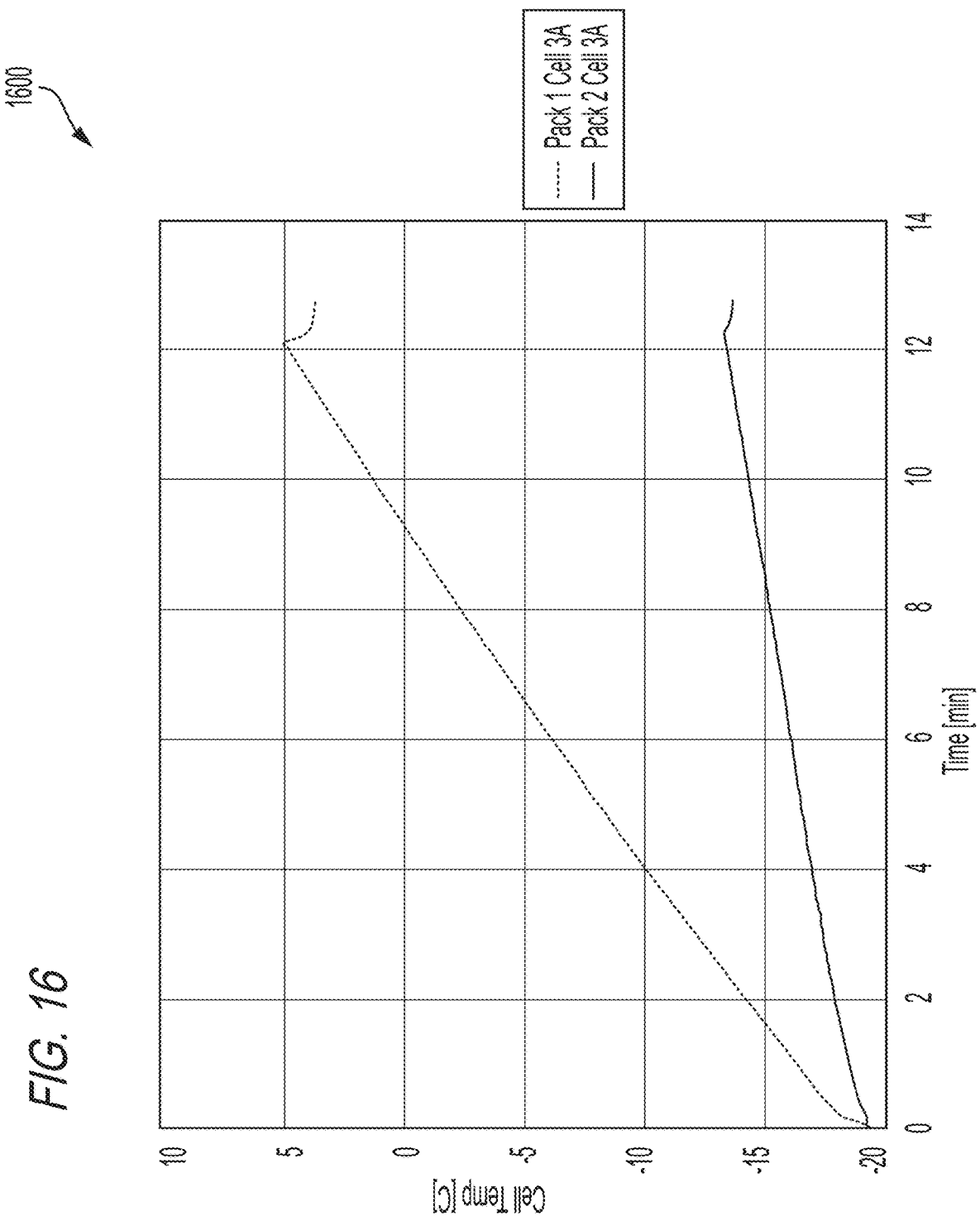
FIG. 16 is a graph of the comparison of battery cell temperatures.

FIG. 16 illustrates the temperature rise of two battery packs within a multi-pack assembly. In this embodiment, two battery packs are inserted in the multi-pack assembly, and both battery packs are graphed to compare the rise in temperature over time between the two packs. As shown, Pack 1 has an immediate rise in cell temperature followed by a steady rise in cell temperature before reaching the pack's maximum temperature just after 12 minutes. Pack 2 was not being heated, however, and had only minimal cell temperature rise overall. Pack 2 reaches its maximum cell temperature just after Pack 1 does. Therefore, the multi-pack assembly can energize either one or both Helmholtz coil stages with the same resonator and the different battery packs can be substantially independently heated.

Figure 17:
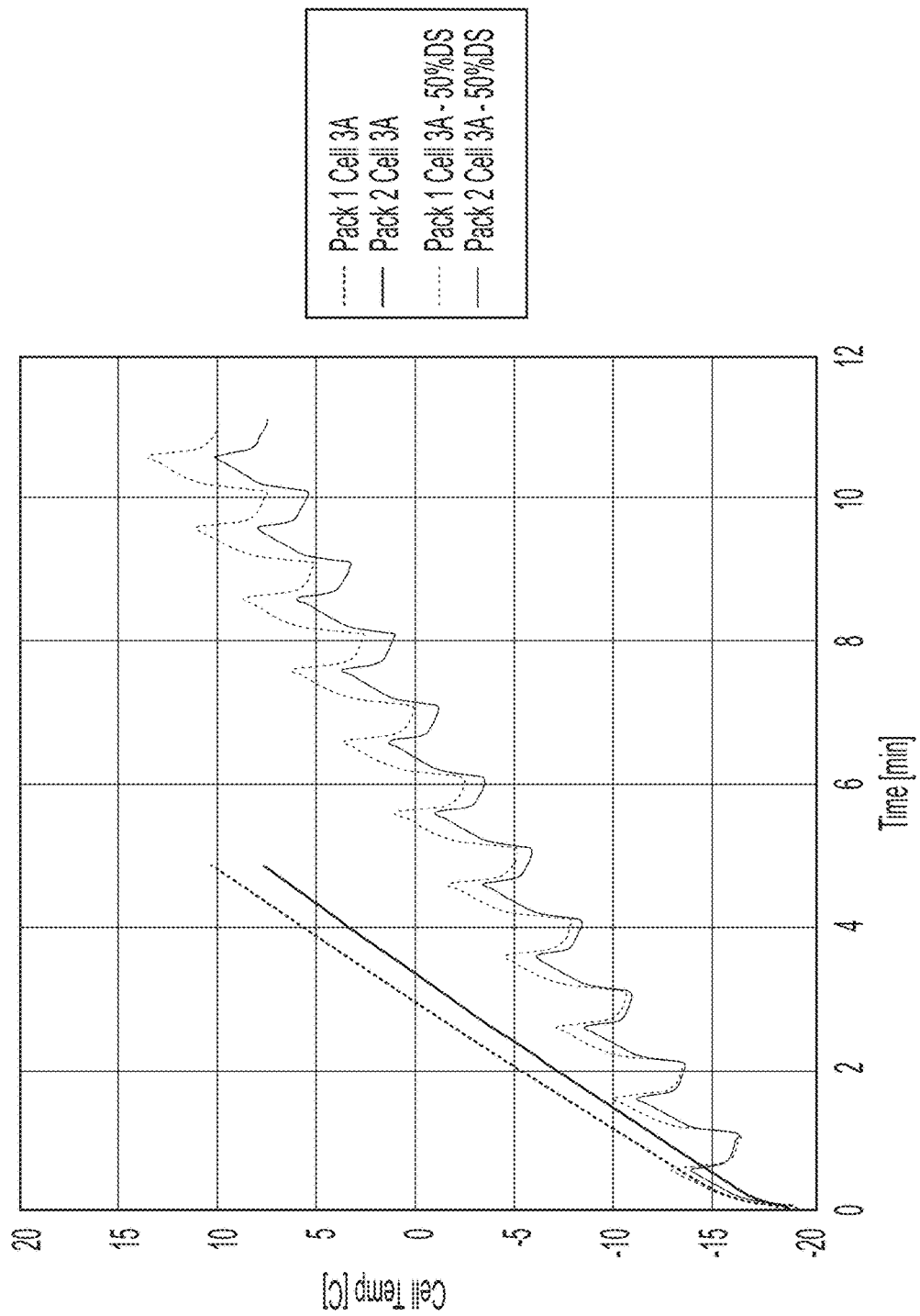
FIG. 17 is a graph of two battery packs being charged at different duty cycles.

FIG. 17 illustrates the temperature rise of two battery packs within a multi-pack assembly. Similar to the illustrated example of FIG. 16, two battery packs are inserted into the multi-pack assembly. This embodiment demonstrates the comparison of the battery packs being set to 50% duty cycle and 100% duty cycle when both coil stages are energized. The relatively straight lines with a steady increase in cell temperature represent both Pack 1 and Pack 2 at a 100% duty cycle. The other two lines showing a fluctuating rise in cell temperature represent both Pack 1 and Pack 2 at 50% duty cycle. Both Pack 1 and Pack 2 thermistor temperatures track together, regardless whether the packs are set to 100% or 50% duty cycle.

Thus, embodiments described herein provide, among other things, systems and methods for charging battery packs. Various features and advantages are set forth in the following claims.

What is claimed is:

1. An inductive heater assembly for heating a power tool battery pack, the inductive heater assembly comprising:
   a housing;
   a battery pack interface configured to receive the power tool battery pack;
   a coil portion located within the housing, the coil portion including:
      a first coil winding and a second coil winding configured to generate an electromagnetic field,
      wherein the first coil winding and the second coil winding to form a Helmholtz coil;
   a first switch electrically connected between a resonator circuit and an input of the first coil winding, the first switch configured to provide a first operating frequency to the first coil winding; and
   a second switch electrically connected between the resonator circuit and an input of the second coil winding, the second switch configured to provide a second operating frequency to the second coil winding.

2. The inductive heater assembly of claim 1, further comprising a temperature sensor configured to sense a temperature related to the power tool battery pack.

3. The inductive heater assembly of claim 1, wherein the resonator circuit is controlled using an active resonator control.

4. The inductive heater assembly of claim 3, wherein the active resonator control is configured to control an operating frequency through pulse-width-modulation.

5. The inductive heater assembly of claim 1, wherein the resonator circuit is controlled using a passive resonator control.

6. The inductive heater assembly of claim 5, wherein the passive resonator control is configured to control at least one capacitor.

7. The inductive heater assembly of claim 1, further comprising a charging base, wherein the charging base is positioned between the first coil winding and the second coil winding.

8. An inductive heating system, the system comprising:
   a power tool battery pack;
   an enclosure including:
      a housing,
      a charging base configured to support a charging interface, and
      at least one coil portion, the at least one coil portion including a first coil winding and a second coil winding, wherein the first coil winding and the second coil winding form a Helmholtz coil;
   a first switch electrically connected between a resonator circuit and an input of the first coil winding, the first switch configured to provide a first operating frequency to the first coil winding; and
   a second switch electrically connected between the resonator circuit and an input of the second coil winding, the second switch configured to provide an operating frequency to the second coil winding.

9. The inductive heating system of claim 8, further comprising a temperature sensor configured to sense a temperature related to the power tool battery pack.

10. The inductive heating system of claim 8, wherein the resonator circuit is controlled using an active resonator control.

11. The inductive heating system of claim 10, wherein the active resonator control is configured to control an operating frequency through pulse-width-modulation.

12. The inductive heating system of claim 8, wherein the resonator circuit is controlled using a passive resonator control.

13. The inductive heating system of claim 12, wherein the passive resonator control is configured to control at least one capacitor.

14. The inductive heating system of claim 8, wherein the charging base is positioned between the first coil winding and the second coil winding.

15. A method of inductively heating a power tool battery pack, the method comprising:
   connecting a power source to a housing including a battery pack interface, the battery pack interface located between a first coil winding and a second coil winding;
   connecting a power tool battery pack to the battery pack interface;
   connecting an input of the first coil winding to a resonator circuit control-through a first switch;
   providing a first operating frequency to the input of the first coil winding using the first switch;
   connecting an input of the second coil winding to the resonator circuit through a second switch;
   providing a second operating frequency to the input of the second coil winding using the second switch; and
   generating an electromagnetic field between the first coil winding and the second coil winding, wherein the first coil winding and the second coil winding form a Helmholtz coil.

16. The method of claim 15, further comprising sensing a temperature related to the power tool battery pack.

17. The method of claim 15, wherein the resonator circuit is controlled by an active resonator control included within the housing.

18. The method of claim 17, further comprising controlling an operating frequency through pulse-width-modulation.

19. The method of claim 15, wherein the resonator circuit is controlled by a passive resonator control included within the housing.

20. The method of claim 15, further comprising controlling at least one capacitor.

\* \* \* \* \*